(12) United States Patent
Suzuki et al.

(10) Patent No.: US 11,059,169 B2
(45) Date of Patent: Jul. 13, 2021

(54) METHOD OF CONTROLLING ROBOT, METHOD OF TEACHING ROBOT, AND ROBOT SYSTEM

(71) Applicant: CANON KABUSHIKI KAISHA, Tokyo (JP)

(72) Inventors: Hideaki Suzuki, Kawasaki (JP); Keita Dan, Tokyo (JP); Naoki Tsukabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 554 days.

(21) Appl. No.: 15/883,711

(22) Filed: Jan. 30, 2018

(65) Prior Publication Data
US 2018/0222049 A1    Aug. 9, 2018

(30) Foreign Application Priority Data

Feb. 9, 2017    (JP) .............................. JP2017-022566

(51) Int. Cl.
*B25J 9/16*    (2006.01)

(52) U.S. Cl.
CPC ............. *B25J 9/1612* (2013.01); *B25J 9/161* (2013.01); *B25J 9/1692* (2013.01); *B25J 9/1697* (2013.01); *G05B 2219/37097* (2013.01); *G05B 2219/37567* (2013.01); *G05B 2219/39029* (2013.01); *G05B 2219/39045* (2013.01);
(Continued)

(58) Field of Classification Search
CPC ...... B25J 9/1612; B25J 9/1692; B25J 9/1697; B25J 9/161; B25J 13/00; B25J 9/1633; B25J 9/0081; G05B 2219/39397; G05B 2219/39045; G05B 2219/39029; G05B 2219/37567; G05B 2219/40613;
(Continued)

(56) References Cited

U.S. PATENT DOCUMENTS

| 4,954,744 A | 9/1990 | Suzuki |
| 4,956,578 A | 9/1990 | Shimizu |

(Continued)

FOREIGN PATENT DOCUMENTS

| CN | 106272416 A | 1/2017 |
| DE | 10 2015 104 587 | 9/2016 |

(Continued)

OTHER PUBLICATIONS

European Search Report dated Jul. 27, 2018 during prosecution of related European application No. 18152468.7.
(Continued)

*Primary Examiner* — Masud Ahmed
(74) *Attorney, Agent, or Firm* — Venable LLP

(57) ABSTRACT

A robot system includes a robot, a vision sensor, a controller, and an input unit. The vision sensor configured to measure a feature point and obtain a measured coordinate value. The controller configured to control the robot. The input unit configured to receive an input from a user toward the controller. The controller obtains, via the input unit, setting information data on a determination point which is different from the feature point. The robot system uses a coordinate value of the determination point and the measured coordinate value, and determines whether the robot is taking a target position and orientation.

21 Claims, 17 Drawing Sheets

(52) U.S. Cl.
CPC ............. *G05B 2219/39397* (2013.01); *G05B 2219/40613* (2013.01); *Y10S 901/09* (2013.01); *Y10S 901/31* (2013.01); *Y10S 901/47* (2013.01)

(58) Field of Classification Search
CPC ......... G05B 2219/37097; Y10S 901/31; Y10S 901/09; Y10S 901/47
See application file for complete search history.

(56) References Cited

U.S. PATENT DOCUMENTS

| | | | |
|---|---|---|---|
| 5,155,416 A | 10/1992 | Suzuki | |
| 5,530,314 A | 6/1996 | Banno | |
| 5,645,462 A | 7/1997 | Banno | |
| 5,650,795 A | 7/1997 | Banno | |
| 5,838,097 A | 11/1998 | Kasanuki | |
| 6,157,137 A | 12/2000 | Suzuki | |
| 6,236,167 B1 | 5/2001 | Yamaguchi | |
| 9,278,454 B2 | 3/2016 | Mimura | |
| 9,669,545 B2 | 6/2017 | Suzuki | |
| 2005/0102060 A1* | 5/2005 | Watanabe | B25J 9/1697 700/245 |
| 2012/0029686 A1* | 2/2012 | Ban | B25J 9/1697 700/218 |
| 2014/0121836 A1* | 5/2014 | Ban | B25J 9/0093 700/259 |
| 2014/0277731 A1* | 9/2014 | Kamiya | B25J 9/1676 700/259 |
| 2015/0224649 A1* | 8/2015 | Watanabe | B25J 9/1607 700/259 |
| 2015/0254380 A1* | 9/2015 | Kimoto | G06F 30/20 703/13 |
| 2017/0217020 A1 | 8/2017 | Suzuki | |

FOREIGN PATENT DOCUMENTS

| | | |
|---|---|---|
| EP | 1 172 183 | 1/2002 |
| JP | 2014-184530 A | 10/2014 |

OTHER PUBLICATIONS

U.S. Appl. No. 15/889,804, filed Feb. 6, 2018.
Chinese Search Report dated Apr. 30, 2021 in corresponding Chinese Application No. 201810114386.7 (Translation included).

* cited by examiner

FIG.6

SETTING OF TARGET VALUE AND DETERMINATION CONDITION

NUMBER OF TEACH POINT  P001

TARGET COORDINATE INPUT METHOD ○ BASE COORDINATE SYSTEM STANDARD  ● MARKER COORDINATE SYSTEM STANDARD

VALUE OF FEATURE POINT

POSITION AND POSTURE OF MARKER COORDINATE SYSTEM (M)

| X | Y | Z | Rx | Ry | Rz |
|---|---|---|----|----|----|
| -25 | -25 | 120 | 180 | 0 | 0 |

COORDINATES OF MARKS

| No. | X | Y | Z |
|---|---|---|---|
| P1 | 10.000 | 10.000 | 0.000 |
| P2 | 40.000 | 10.000 | 0.000 |
| P3 | 10.000 | 40.000 | 0.000 |

DETERMINATION POINT

| SET | NAME | X | Y | Z |
|---|---|---|---|---|
| ☐ | SENSOR COORDINATE SYSTEM | 20.152 | 1.238 | 14.941 |
| ☑ | BASE COORDINATE SYSTEM | 0.000 | 0.000 | 0.000 |
| ☐ | TOOL COORDINATE SYSTEM | 0.000 | 0.000 | 0.000 |
| ☐ | (USER DEFINITION) | | | |

FIRST THRESHOLD  0.1  mm

SECOND THRESHOLD  0.2  mm

CANCEL    SAVE

NG DETERMINATION

OK DETERMINATION

OK DETERMINATION

NG DETERMINATION

METHOD OF CONTROLLING ROBOT, METHOD OF TEACHING ROBOT, AND ROBOT SYSTEM

BACKGROUND OF THE INVENTION

Field of the Invention

The present invention relates to controlling a robot.

Description of the Related Art

In factories, a robot system is used to automate work, such as transfer of parts, assembly, and processing. The robot system has a robot which has multiple degrees of freedom. Examples of the robot having multiple degrees of freedom include a vertically articulated robot, a horizontally articulated robot, a parallel link robot, and a Cartesian coordinate robot. A user can cause a robot to move in accordance with a robot program, and thereby can cause the robot to perform a variety of types of work for respective purposes. In a case where the work, such as transfer, assembly, and processing, is performed on parts having variation, or where teaching is performed at the start up of a production line or after a changeover, one technique adjusts a positional difference of a robot by using a vision sensor. For example, Japanese Patent Application Publication No. 2014-184530 proposes a technique for teaching a robot. In this technique, a camera is attached to a leading end of a welding robot, and the robot is forced to repeatedly perform a motion to correct positional difference between a mark and a target position and orientation.

When repetitive control, which repeatedly causes a robot to perform a motion to correct the posture of a robot, is performed by using a vision sensor, a threshold needs to be determined in advance for determining whether the repetitive control is complete. The technique of Japanese Patent Application Publication No. 2014-184530 determines whether a translational distance of the robot with respect to a component converges, by using a threshold for the positional difference, in a translational direction, of the mark contained in an image. In addition, this technique corrects the tilt of a camera with respect to the mark, by using the circularity of the mark contained in the image; and determines whether the tilt angle of the robot with respect to the component converges, by using a threshold for the circularity of the mark. The thresholds used for these determinations are each determined empirically by a worker for the robot system. In a case where positioning accuracy for the leading end of the robot in the translational direction is important, accuracy for the tilt angle has not been important as long as the threshold for the translational direction is appropriately set. In recent years, however, since robots are used also for precise work, such as precise assembly, the tilt of leading ends of the robots is also required to be set with high accuracy. For this reason, in the case where a worker determines whether the tilt of a leading end of a robot converges, by calculating the circularity of a mark, the worker is required to correctly understand the relationship between the displacement of the leading end of the robot and the amount of change in the circularity of the mark and set a threshold for the circularity. However, calculating the threshold for the circularity, in consideration of factors such as arrangement of the vision sensor, takes time. In addition, because error factors of the vision sensor are also required to be considered, setting an appropriate threshold applies a heavy workload to a worker.

SUMMARY OF THE INVENTION

According to a first aspect of the present invention, a method of controlling a robot includes measuring a measured coordinate value of a feature point by using a vision sensor supported by the robot, computing a converted amount of positional difference, the converted amount of positional difference being obtained by converting an amount of positional difference between the measured coordinate value and a predetermined target coordinate value of the feature point, to an amount of positional difference of a determination point different from the feature point, and comparing at least the converted amount of positional difference with a first threshold, and determining whether a posture of the robot is within a target range.

According to a second aspect of the present invention, a method of teaching a robot includes measuring a measured coordinate value of a feature point through a measurement using a vision sensor supported by the robot, computing a converted amount of positional difference, the converted amount of positional difference being obtained by converting an amount of positional difference between the measured coordinate value and a predetermined target coordinate value of the feature point, to an amount of positional difference of a determination point different from the feature point, comparing at least the converted amount of positional difference with a first threshold, and correcting a posture of the robot depending on the amount of positional difference if the amount of positional difference exceeds the first threshold, and repeating the measuring, the computing, and the correcting, and setting, as a teach point, a posture of the robot obtained in a state where the converted amount of positional difference is equal to or smaller than the first threshold.

According to a third aspect of the present invention, a robot system includes a robot, a vision sensor supported by the robot, and a controller configured to control the robot and the vision sensor. The controller is configured to calculate a transformation parameter which indicates an amount of positional difference between a measured coordinate value of a feature point obtained by using the vision sensor and a predetermined target coordinate value of the feature point, and correct a posture of the robot so that a converted amount of positional difference is equal to or smaller than a predetermined threshold. The converted amount of positional difference is calculated by applying the transformation parameter to coordinates of a determination point positioned at a position different from the feature point.

According to a fourth aspect of the present invention, a robot system includes a robot, a vision sensor configured to measure a feature point and obtain a measured coordinate value, a controller configured to control the robot, and an input unit configured to receive an input from a user toward the controller. The controller obtains, via the input unit, setting information data on a determination point which is different from the feature point. The robot system uses a coordinate value of the determination point and the measured coordinate value, and determines whether the robot is taking a target position and orientation.

Further features of the present invention will become apparent from the following description of exemplary embodiments with reference to the attached drawings.

BRIEF DESCRIPTION OF THE DRAWINGS

FIG. 6 is an explanatory diagram illustrating a setting window displayed on a display.

DESCRIPTION OF THE EMBODIMENTS

Hereinafter, some embodiments of the present invention will be described in detail with reference to the accompanying drawings.

First Embodiment

Figure 1:
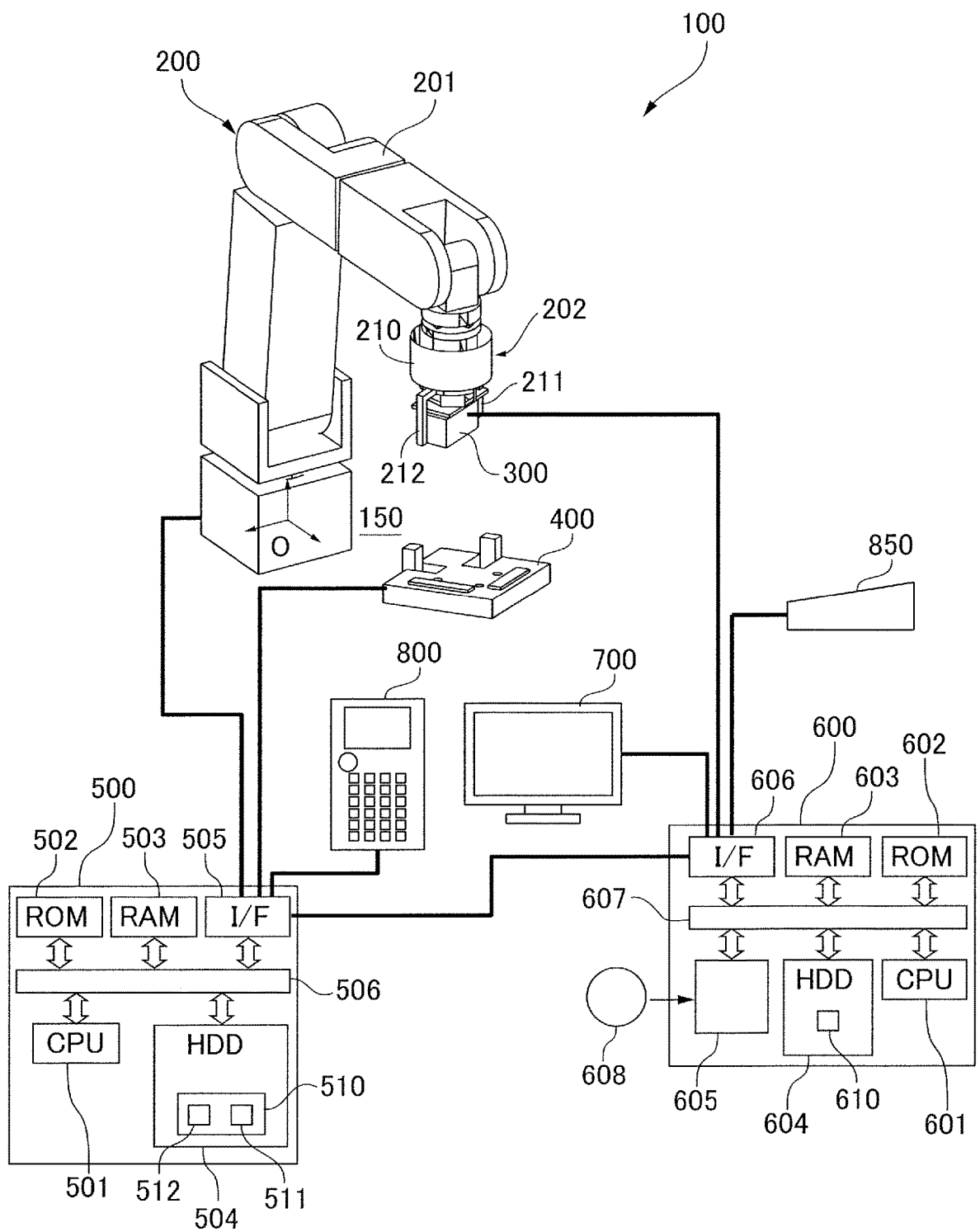
FIG. 1 is an explanatory diagram of a robot system of a first embodiment.

FIG. 1 is an explanatory diagram of a robot system of a first embodiment. A robot system 100 includes a robot 200, a stereo camera 300 which is one example of vision sensors, a workpiece holding jig 400, a robot control device 500, a sensor control device 600, a display 700, a teaching pendant 800, and an input device 850. The robot 200 includes a robot arm 201, and a robot hand 202 which is one example of end effectors. The robot arm 201 is a vertically articulated robot arm. The base end of the robot 200, that is, the base end of the robot arm 201 is fixed to a stand 150.

The leading end of the robot arm 201 is provided with a robot hand 202 attached thereto, directly or via a force sensor (not illustrated). That is, the leading end of the robot 200 is the robot hand 202. The robot hand 202 includes a palm unit 210 which is a hand body, and a plurality of fingers 211 and 212 which can open and close with respect to the palm unit 210. In the first embodiment, the number of the fingers is two. With these components, the robot hand 202 can hold or release a workpiece. The palm unit 210 includes a housing and a driving mechanism which is housed by the housing and configured to drive the fingers 211 and 212.

The workpiece holding jig 400 is a jig which chucks a workpiece so that the workpiece does not move with respect to the stand 150, and which is fixed to the stand 150. The workpiece holding jig 400 is disposed in an area within which the robot hand 202 can move. The leading end of the robot 200, that is, the robot hand 202 can move with six degrees of freedom, in a robot coordinate system O whose origin is at the base end of the robot 200. Specifically, the robot hand 202 can move in three translational directions and three rotational directions, with the aid of the motion of the robot arm 201. The translational directions correspond to three axes which are orthogonal to each other in the robot coordinate system O, and the rotational directions are directions around the three axes.

The teaching pendant 800 is used to send a command to the robot control device 500 through the operation by a user. Upon receiving the command, the robot control device 500 causes the robot 200 to move, depending on the command. That is, by operating the teaching pendant 800, the user can move the robot arm 201, and perform a jog feed on the robot hand 202 in any direction and at any speed. Also, by operating the teaching pendant 800, the user allows the robot 200 to open and close the fingers 211 and 212 of the robot hand 202.

The robot control device 500 mainly controls the motion of the robot 200. The sensor control device 600 mainly controls the operation of the stereo camera 300, and performs computing processes, such as an image processing and a measurement process.

The robot control device 500 is a computer, and includes a central processing unit (CPU) 501. In addition, the robot control device 500 includes, as internal memories, a read only memory (ROM) 502, a random access memory (RAM) 503, and a hard disk drive (HDD) 504. The robot control device 500 also includes an interface (I/F) 505 and a bus 506. The CPU 501, the ROM 502, the RAM 503, the HDD 504, and the interface 505 are communicatively connected with each other via the bus 506.

The sensor control device 600 is a computer, and includes a CPU 601. In addition, the sensor control device 600 includes, as internal memories, a ROM 602, a RAM 603, and an HDD 604. The sensor control device 600 also includes a recording-disk drive 605, an interface (I/F) 606, and a bus 607. The CPU 601, the ROM 602, the RAM 603, the HDD 604, the disk drive 605, and the interface 606 are communicatively connected with each other via the bus 607.

The interface 505 of the robot control device 500 is connected to the robot 200, the workpiece holding jig 400, and the teaching pendant 800 via communication lines. The interface 606 of the sensor control device 600 is connected to the stereo camera 300, the display 700, and the input device 850 via communication lines. In addition, the interface 505 of the robot control device 500 and the interface 606 of the sensor control device 600 are connected with each other via a communication line. Thus, the CPU 501 and the CPU 601 can communicate with each other. In the first embodiment, the two CPUs, the CPU 501 and the CPU 601, function as a control unit.

The ROM 502 of the robot control device 500 stores a base program. The RAM 503 is a memory to temporarily store various data, such as results of a computing process performed by the CPU 501. The HDD 504 stores a robot program 510 which defines the motion of the robot 200. The robot program 510 includes teach point information 511 and command information 512. The CPU 501 controls the motion of the robot 200 depending on the robot program 510, and causes the robot 200 to perform work, such as workpiece assembly work. When setting the teach point information 511, that is, performing teaching work, the CPU 501 controls the motion of the robot 200 depending on a command from the CPU 601 of the sensor control device 600, or on a command from the teaching pendant 800. That is, the CPU 501 determines a posture of the robot 200, which the robot 200 is required to take, from information from the CPU 601; and causes the robot 200 to actually move, in accordance with the posture information which the CPU 501 has determined. In addition, the CPU 501 can create or update the posture information, which is used when the robot 200 is actually moved, as the teach point information 511.

The ROM 602 of the sensor control device 600 stores a base program. The RAM 603 is a memory to temporarily store various data, such as results of a computing process performed by the CPU 601. The HDD 604 stores a program 610 used when the teaching is performed. The disk drive 605 can read various data or a program recorded on a disk 608. When teaching the robot 200, the CPU 601 controls the operation of the stereo camera 300 and controls the motion of the robot 200 via the robot control device 500, depending on the program 610. In addition, the CPU 601 controls displaying operation of the display 700. For example, the CPU 601 causes the display 700 to display image data captured by the stereo camera 300 and resultant data obtained by executing image processing, and provides information to a user. The input device 850 may be a keyboard or a mouse, and can output information, such as characters, numerical values, or a pointer position, to the sensor control device 600 by a user operating the input device 850 while watching the display 700.

In the first embodiment, the description will be made for a case where the HDD 604 is a computer-readable recording medium and stores the program 610. However, the present disclosure is not limited to this. The program 610 may be recorded in any recording medium as long as the recording medium is a computer-readable recording medium. For example, the ROM 602, the disk 608, or an external memory (not illustrated) may be used as the recording medium that provides the program 610. Specifically, a flexible disk, an optical disk, a magneto-optical disk, a magnetic tape, a nonvolatile memory such as a USB memory, an SSD, or the like may be used as the recording medium.

Also in the first embodiment, the description has been made for the case where the robot control device 500 and the sensor control device 600 are each achieved by a single computer, and thus the robot system 100 has two computers in total. However, the present disclosure is not limited to this. Both functions of the robot control device 500 and the sensor control device 600 may be achieved by a single computer, or may be achieved by three or more computers which perform distributed processing. Furthermore, although the sensor control device 600 is disposed outside the housing of the stereo camera 300, the same function may be achieved by a smart camera which is housed by the housing.

Figure 2A:
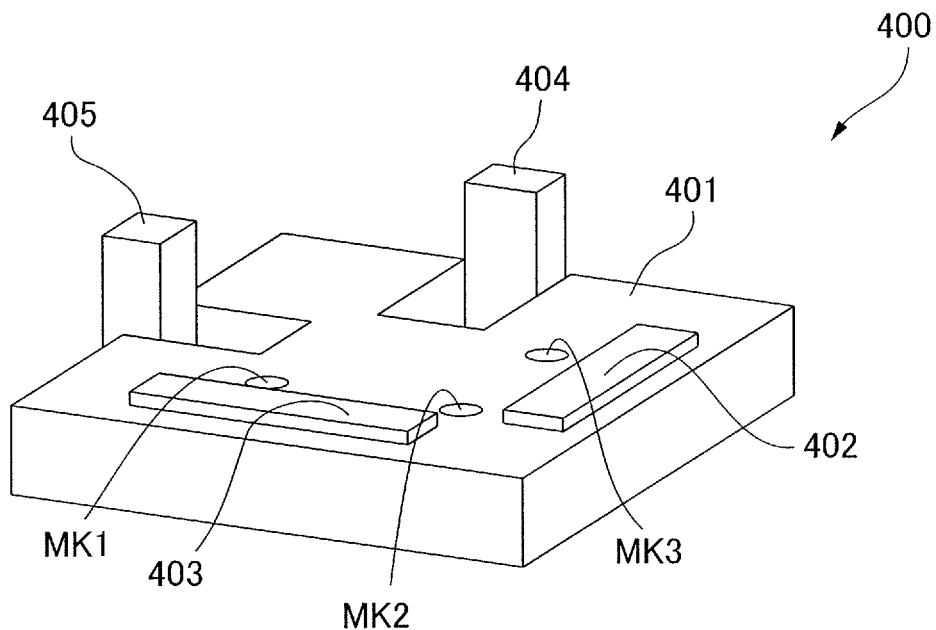
FIG. 2A is a perspective view of a workpiece holding jig.
Figure 2B:
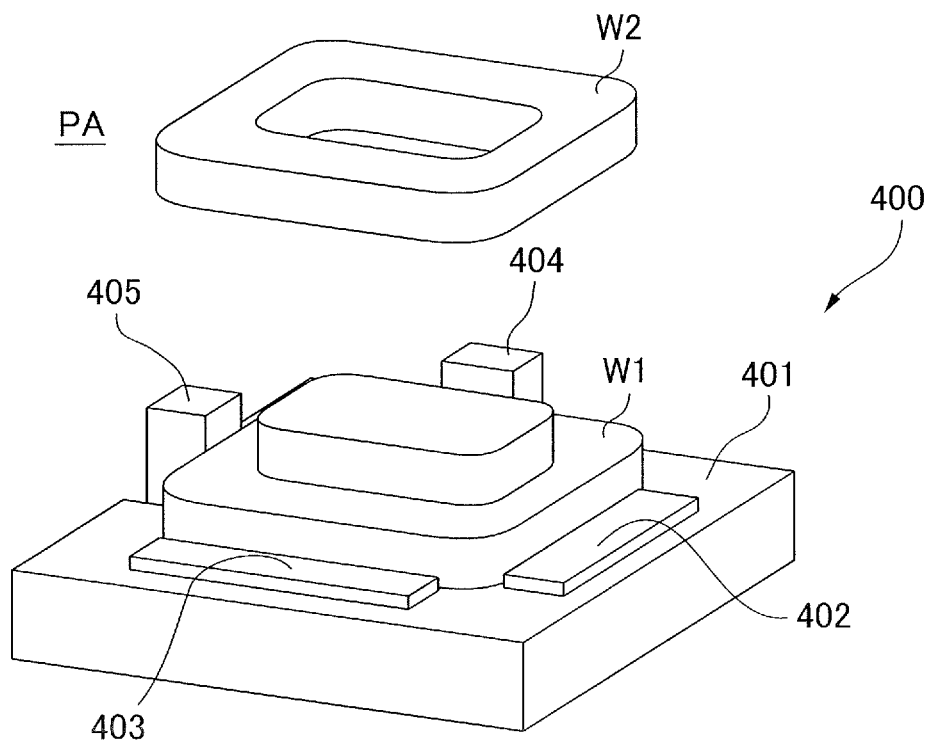
FIG. 2B is a perspective view of the workpiece holding jig, a first workpiece, and a second workpiece.

FIG. 2A is a perspective view of a workpiece holding jig 400. FIG. 2B is a perspective view of the workpiece holding jig 400, a workpiece W1 which is a first workpiece, and a workpiece W2 which is a second workpiece. As illustrated in FIG. 2A, the workpiece holding jig 400 includes a base portion 401, work butted-against portions 402 and 403 which are fixed to the base portion 401, and jig fingers 404 and 405. The workpiece holding jig 400 can open and close the jig fingers 404 and 405, depending on the robot program 510. The workpiece W1 can be chucked by closing the jig fingers 404 and 405 in a state where the workpiece W1 is placed on the base portion 401.

FIG. 2B illustrates a state where the workpiece W1 is held by the workpiece holding jig 400. In the first embodiment, fitting work for the workpieces W1 and W2 is performed as assembly work, in which the workpiece W2 is assembled to the workpiece W1. Specifically, the fitting work is performed by causing the workpiece holding jig 400 to hold the workpiece W1, causing the robot hand 202 to hold the workpiece W2, and moving the robot arm 201. As illustrated in FIG. 2B, when the fitting work is performed, the robot hand 202 holding the workpiece W2 is moved to a work start position PA which is directly above the workpiece W1, and then the workpiece W2 is moved from the work start position PA to a position directly below the work start position PA. Thus, a correct teaching is required to correctly position the robot hand 202, that is, the workpiece W2 at the work start position PA.

In the first embodiment, the stereo camera 300 is used to teach the robot 200. The stereo camera 300 is capable of connecting to and disconnecting from the robot 200. Specifically, the stereo camera 300 is held by the robot hand 202 in a state where the stereo camera 300 is positioned with respect to the robot hand 202.

Figure 3A:
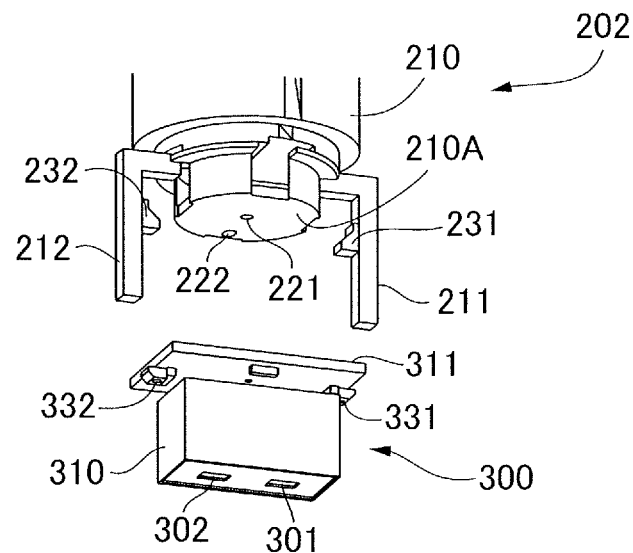
FIG. 3A is a perspective view illustrating a state where a stereo camera is released by a robot hand.
Figure 3B:
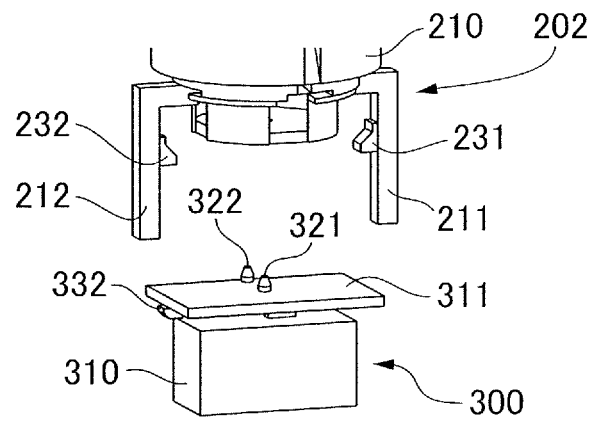
FIG. 3B is a perspective view in which the robot hand and the stereo camera illustrated in FIG. 3A are seen from another direction.
Figure 3C:
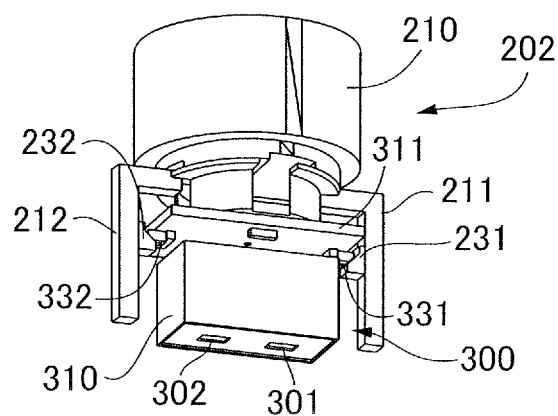
FIG. 3C is a perspective view illustrating a state where the stereo camera is held by the robot hand.

FIGS. 3A, 3B, and 3C are perspective views of the robot hand 202 and the stereo camera 300 of the first embodiment. FIGS. 3A and 3B illustrate a state where the stereo camera 300 is released by the robot hand 202, and FIG. 3C illustrates a state where the stereo camera 300 is held by the robot hand 202. The stereo camera 300 is a camera which captures an image of a measured object by using the stereo method so that a three-dimensional position and orientation of the measured object can be measured. The stereo camera 300 can capture an image upon receiving an imaging command from the sensor control device 600, and send the acquired image data to the sensor control device 600. The stereo camera 300 has a camera 301 which is a first camera, and a camera 302 which is a second camera. The two cameras, 301 and 302, are disposed in the interior of the camera housing 310. The cameras 301 and 302 are digital cameras having an image pickup element, such as a CCD image sensor or a CMOS image sensor. The camera housing 310 is fixed to a base portion 311 via an attachment portion (not illustrated). The base portion 311 is provided with positioning pins 321 and 322, and tapered portions 331 and 332, as an attaching and detaching mechanism to/from the robot hand 202.

A flat surface 210A of the palm unit 210 of the robot hand 202 is provided with a round hole 221 and an elongated hole 222 at positions corresponding to the positioning pins 321 and 322 of the stereo camera 300. The flat surface 210A of the palm unit 210 of the robot hand 202, the round hole 221, and the elongated hole 222 are mechanical references of the robot hand 202, and the fingers 211 and 212 are mounted within predetermined tolerances with respect to the mechanical references. Specifically, in a state where a finger adjustment jig (not illustrated) is positioned with respect to the palm unit 210 by using the flat surface 210A of the palm unit 210, the round hole 221, and the elongated hole 222, the installation positions of the fingers 211 and 212 in an opening and closing direction of the fingers 211 and 212 is adjusted with respect to the finger adjustment jig (not illustrated). The dimension between the fingers 211 and 212 in the opening and closing direction can be adjusted by attaching shims, having different thicknesses, to an opening and closing mechanism (not illustrated) so as to sandwich the fingers. In this manner, the fingers 211 and 212 are adjusted with respect to the palm unit 210. When the base portion 311 for the stereo camera 300 is pressed against the palm unit 210 of the robot hand 202, the surface of the base portion 311 and the surface of the palm unit 210 abut against each other, and the positioning pins 321 and 322 engage with the round hole 221 and the elongated hole 222, respectively. With this operation, the stereo camera 300 can be positioned with respect to the robot hand 202. Inside the fingers 211 and 212, tapered portions 231 and 232 are disposed. When the fingers 211 and 212 are closed in a state where the base portion 311 is pressed against the palm unit 210, the tapered portions 231 and 232 of the robot hand 202 engage with the tapered portions 331 and 332 of the stereo camera 300, respectively. The tapered portions 231 and 232, and 331 and 332 produce force which presses the base portion 311 against the palm unit 210, so that the stereo camera 300 can be stably fixed to the robot hand 202. Thus, the attaching and detaching mechanism is configured to directly attach the stereo camera 300 to the robot hand 202. This configuration reduces influence caused by an error of the robot arm 201 and an error, produced in production of the robot hand 202, between a palm unit 210 and a flange surface which is the leading end of the robot arm 201, and thus the teaching work can be performed with high accuracy. Thus, the stereo camera 300 is held by the robot hand 202, and thereby supported by the robot 200.

In the first embodiment, the workpiece holding jig 400 is a measured object used when the teaching work is performed. The workpiece holding jig 400 illustrated in FIG. 2A is provided with a plurality of marks MK1 to MK3. The marks MK1 to MK3 can be measured by the stereo camera 300, and are one example of feature points. The marks MK1 to MK3 are positioned with respect to mechanical references of the workpiece holding jig 400, with high accuracy. The mechanical references may be the work butted-against portions 402 and 403. The marks MK1 to MK3 are formed on the top face of the base portion 401, and have a predetermined precision range of thickness or depth in a height direction. The marks MK1 to MK3 are black so as to have a sufficient contrast to the base portion 401, so that they can be recognized with high accuracy as the feature points, through image processing. Here, any method may be used to provide the marks MK1 to MK3 to the base portion 401. For example, laser beam machining, printing, etching, plating, or sticking seals may be used to provide the marks. In addition, although the examples are given for the case where the marks MK1 to MK3 are directly provided to the workpiece holding jig 400, the marks MK1 to MK3 may be temporarily arranged only in the teaching, by providing the marks to another member which serves as a reference plate, and attaching the reference plate to the workpiece holding jig 400.

Figure 4:
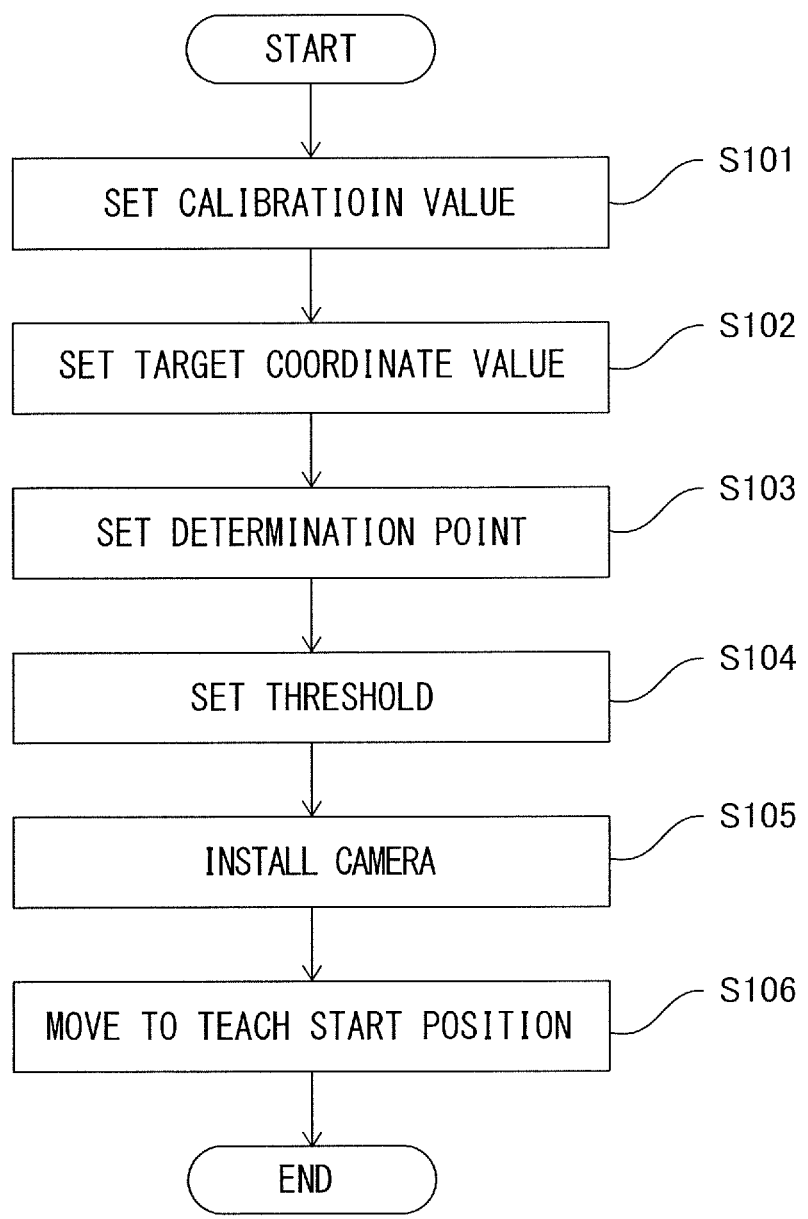
FIG. 4 is a flowchart illustrating an advance preparation for teaching, according to the first embodiment.

FIG. 4 is a flowchart illustrating an advance preparation for teaching, according to the first embodiment. First, the process sets a calibration value of the stereo camera 300 (S101). In Step S101, the process performs two types of calibration: (1) stereo camera calibration, and (2) calibration between base and camera. The process then sets parameters of the calibration to the sensor control device 600, that is, causes the HDD 604 to store the parameters.

(1) Stereo Camera Calibration

The process calibrates stereo camera parameters. The stereo camera parameters are used to obtain a three-dimensional measurement value from corresponding point coordinates on stereo images, captured by the stereo camera 300. Specifically, the process determines a camera internal parameter of each of the cameras 301 and 302. The camera internal parameter indicates a relationship between a pixel coordinate value, expressed in units of pixels, of each of the images captured by the cameras 301 and 302 and a line-of-sight vector in a three-dimensional space. The process also determines a camera external parameter. The camera external parameter indicates a relative position and orientation between the camera 301 and the camera 302. That is, the process determines, as the camera external parameter, a coordinate transformation matrix. The coordinate transformation matrix indicates the relative position and orientation between a first sensor coordinate system which represents the position and orientation of the camera 301 and a second sensor coordinate system which represents the position and orientation of the camera 302. As to the calibration for such a stereo camera, a variety of methods are known. If feature points are extracted from an image captured by the camera 301 and an image captured by the camera 302, there can be determined a three-dimensional coordinate value of the feature points, which is seen from a sensor coordinate system. In the first embodiment, the camera 301 is a reference camera, and thus the result of the stereo measurement is expressed as a coordinate value seen from the first sensor coordinate system. Hereinafter, the first sensor coordinate system is expressed as a sensor coordinate system V, which is a coordinate system representing the position and orientation of the stereo camera 300.

(2) Calibration Between Base and Camera

The previously-described stereo camera calibration makes it possible to measure the positions of feature points seen from the sensor coordinate system V, in three dimensions with high accuracy. However, because the sensor coordinate system V is a coordinate system whose origin is the lens principal point of the camera 301, the position and orientation of the sensor coordinate system V cannot be directly measured from the outside. Thus, in the first embodiment, calibration between base and camera is also performed to determine a position and orientation of the sensor coordinate system V with respect to the base portion 311. The calibration result data is stored in the HDD 604 of the sensor control device 600. The method of the calibration between base and camera, which calibrates the relationship between the base portion 311 and the sensor coordinate system V, will be described in detail.

Figure 5A:
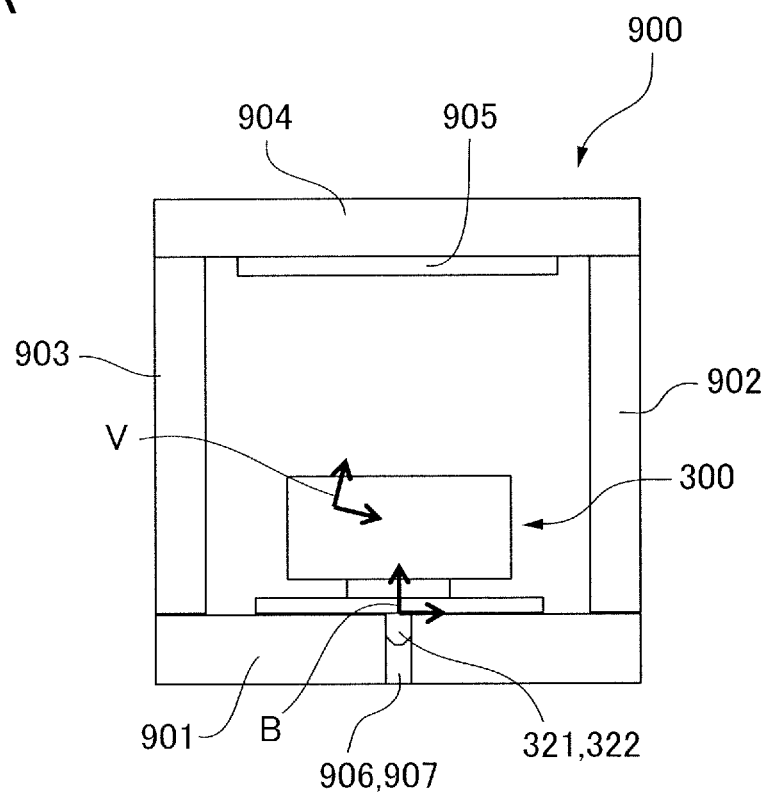
FIG. 5A is an explanatory diagram of a calibration jig used for calibration.

FIG. 5A is an explanatory diagram of a calibration jig 900 used for the calibration. The calibration jig 900 includes a base portion 901, pillar portions 902 and 903, a top plate portion 904, and a reference pattern portion 905. The base portion 901 and the top plate portion 904 are plate-like members which are disposed facing each other, and joined with each other via the pillar portions 902 and 903. The base portion 901 is provided with holes 906 and 907 at positions corresponding to the pins 321 and 322 of the stereo camera 300, as is the round hole 221 and the elongated hole 222 of the palm unit 210. With this structure, the stereo camera 300 can be positioned with high reproducibility.

Figure 5B:
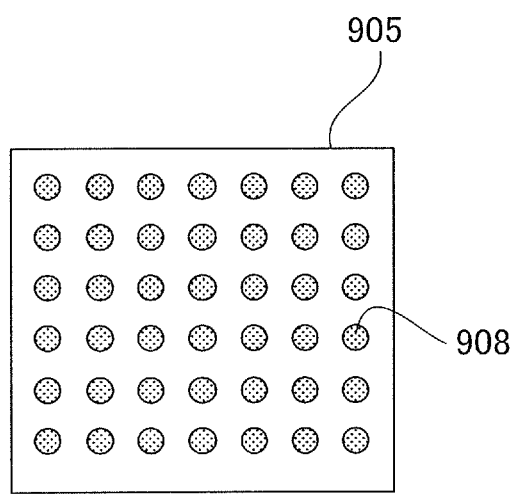
FIG. 5B is a plan view of a reference pattern portion.

FIG. 5B is a plan view of the reference pattern portion 905. The reference pattern portion 905 is disposed on the inner surface of the top plate portion 904. The reference pattern portion 905 is a plate-like member. On the surface of the reference pattern portion 905, K number of marks 908, which are made with high accuracy through an etching process or the like, are formed like an array. Positions of the top face of the base portion 901, the holes 906 and 907, and the reference pattern marks 908 are measured with a measuring instrument (not illustrated) after the calibration jig 900 is made, and thus the relationship of those components is known with high accuracy. In addition, a base coordinate system B is set with respect to the measurement values of the top face of the base portion 901 and the holes 906 and 907. The base coordinate system B is a coordinate system of the vision sensor, and corresponds to a position and orientation of the stereo camera 300 at the installation reference position of the stereo camera 300. Moreover, three-dimensional coordinate values m(i) (i=1 to K) of the marks 908 are coordinate-transformed to three-dimensional coordinate values $^B m(i)$ (i=1 to K) seen from the base coordinate system B, and the three-dimensional coordinate values $^B m(i)$ are stored in a computing unit of a calibration apparatus (not illustrated). Thus, in a state where the stereo camera 300 is positioned with respect to the calibration jig 900, the marks 908 of the reference pattern portion 905 are measured in stereo, and thereby a relationship between the base coordinate system B and the sensor coordinate system V can be determined.

The relationship between the base coordinate system B and the sensor coordinate system V is expressed by a rotation matrix $R_C$ and a translation vector $t_C$. If coordinate values $^V m(i)$ (i=1 to K) seen from the sensor coordinate system V, obtained when the marks 908 are measured in stereo, have no errors, the following expression (1) holds.

$$^B m[i] = R_C \cdot {}^V m[i] + t_C (1=1,2,3,\ldots,K) \quad (1)$$

However, since actual measurement data has errors, the left side and the right side of the expression (1) is not exactly equal to each other. For this reason, least squares solutions are obtained by solving the following expression (2).

$$\sum_{i=1}^{K} |{}^B m[i] - (R_C \cdot {}^V m[i] + t_C)|^2 \Rightarrow \min \quad (2)$$

That is, the rotation matrix $R_C$ and the translation vector $t_C$ which satisfy the expression (2) are determined as the least squares solutions. This problem is known as the matching problem between point sets, and can be solved by using, for example, an approach which uses singular value decomposition. With this solution, the rotation matrix $R_C$ and the translation vector $t_C$ are obtained as calibration values between base and camera, which are used to coordinate-transform a coordinate value with respect to the sensor coordinate system V to a coordinate value with respect to the base coordinate system B.

Next, a target coordinate value of the teaching is set (S102). In the first embodiment, the target coordinate value is set so that the workpiece W2 is positioned at the position PA, as illustrated in FIG. 2B. FIG. 6 is an explanatory diagram illustrating a setting window displayed on the display 700. A user can set the target coordinate value while watching the setting window illustrated in FIG. 6.

The setting of the target coordinate value of the teaching is performed by inputting the mechanical references of the stereo camera 300, such as the surface of the base portion 311 and the positioning pins 321 and 322, and a positional relationship in design between the marks MK1 to MK3 provided to the workpiece holding jig 400. For example, three-dimensional target coordinate values $^B p(i)$ (i=1 to 3) of the marks MK1 to MK3, in design, with respect to the base coordinate system B is set. Here, the target coordinate values $^B p(i)$ (i=1 to 3) are three-dimensional coordinate values, each expressed by a vector having three components of XYZ. The target coordinate values $^B p(i)$ may be set by a user selecting the target coordinate values $^B p(i)$ from a list of target coordinate values, which is stored in advance in the HDD 604 of the sensor control device 600, or may be set by a user operating the input device 850 and inputting numerical values into the input device 850. In the case where a user uses the input device 850 to input numerical value, a marker coordinate system M representing a position and orientation of the marks MK1 to MK3 may be introduced to more simplify the input operation. In this case, the user inputs three-dimensional coordinate values $^M p(i)$ (i=1 to 3) of the marks MK1 to MK3 with respect to the marker coordinate system M, and design values of a relative position and orientation of the marker coordinate system M with respect to the base coordinate system B. Where the design values are expressed by a rotation component of $^B R_M$ and a translation component of $^B t_M$, the three-dimensional coordinate values $^B p(i)$ (i=1 to 3) of the marks MK1 to MK3 are expressed by the following expression (3).

$$^B p[i] = {}^B R_M {}^M p[i] + {}^B t_M (i=1,2,3) \quad (3)$$

With the input operation performed in the marker coordinate system M, the arrangement of the marks MK1 to MK3 determined by only a shape of the marks MK1 to MK3 can be set separately from a position and orientation of the robot hand 202 with respect to the marker coordinate system M. This simplifies the setting when the number of the marks is large. In the example of the setting window 710 illustrated in FIG. 6, a three-dimensional CAD model of the robot hand 202 and the stereo camera 300 is displayed, and a position and orientation of the base coordinate system B is indicated over the CAD model by arrows. In addition, on the CAD model window, arrows indicating a position and orientation of the marker coordinate system M and points indicating points p1 to p3 of the marks MK1 to MK3 are superimposed, in accordance with position and orientation information on the marker coordinate system M and coordinate values of the marks, which are inputted by a user. Since the user can intuitively check the inputted setting information, the setting becomes easier and error can hardly occur. Thus, Step S102 causes the HDD 604 of the sensor control device 600 to store the target coordinate values $^B p(i)$ of the marks MK1 to MK3 with respect to the base coordinate system B.

Next, a determination point is set (S103). The determination point is an imaginary point used for computation of a later-described convergence determination, and is different from the feature points measured by using the stereo camera 300. The determination point is additionally provided, separately from the feature points for allowing the tilt of the stereo camera 300 with respect to the marks MK1 to MK3 to quickly converge into a desired precision range. A coordinate value $^B p_{add}$ of the determination point with respect to the base coordinate system B is stored in the HDD 604 of the sensor control device 600. Since the determination point is the imaginary point used only for computation, the determination point may be positioned outside the field of view of the stereo camera 300, that is, outside the measurable range of the stereo camera 300. The determination point is a freely-selected point, but it is preferably positioned closer to the stereo camera 300 or the robot 200 than the marks MK1 to MK3 which serve as the feature points. More preferably, the determination point is a freely-selected point within a certain region. The certain region is obtained by adding a region (hereinafter, referred to as a holding region), which is surrounded by the fingers 211 and 212 and the palm unit 210, and in which the robot hand 202 can hold a workpiece, and an outer shape of the workpiece held by the robot hand 202. For example, the determination point may be the origin of the base coordinate system B or the origin of the sensor coordinate system V, or may be a leading end point of the finger 211. When the determination point is set, a user may operate the input device 850 and directly input a numerical value into the input device 850, or may select one of options indicated as freely-selected feature points, other than the marks MK1 to MK3, and the origins of the coordinate systems of the robot system 100. In the latter case, the user can select and set one of options, such as the origin of the base coordinate system B and the origin of a tool coordinate system T, while watching the screen of the display 700. This makes the setting work easier than the former case in which a numerical value is inputted as the determination point.

In the example of the setting window 710 illustrated in FIG. 6, the setting window 710 displays the origins of the base coordinate system B, the tool coordinate system T, and the sensor coordinate system V. Thus, a user can select one by enabling a corresponding check box. In addition, the field of "user definition" of the setting window 710 allows a user to freely set a coordinate value. The numerical value inputted by a user may allow the position of a corresponding three-dimensional point to be superimposed on the CAD window, or conversely, a user may select a feature point from among surfaces and corners of a model on the CAD window, through an operation like a click, and thereby set the determination point on the GUI. One or more determination points may be set, but in the first embodiment, the description will be made for a case where a single determination point is set. Thus, Step S103 causes the HDD 604 of the sensor control device 600 to store the coordinate values $^B p_{add}$ of the determination point with respect to the base coordinate system B.

In the above description, the description has been made for the case where a user is involved with the setting of the determination point. However, the robot system 100 may automatically set the determination point in accordance with a shape of the robot hand 202 attached to the robot 200. For example, the HDD of the sensor control device 600 may store a table used to associate types of the robot hand 202 with corresponding determination points, and the robot system 100 may obtain the information on the attached robot hand 202 and automatically set a corresponding determination point. In this case, a user needs not to set the determination point, and the determination point is automatically set to perform the correcting motion which corrects the posture of the robot.

Furthermore, the process sets a threshold δ which is a first threshold, and a threshold Δ which is a second threshold (S104). The threshold δ is a threshold used for a later-described convergence determination, and the threshold Δ is a threshold used for a later-described determination of shape residual. A user can freely set the thresholds δ and Δ in consideration of accuracy required for an intended use. In the setting window 710 illustrated in FIG. 6, the thresholds can be specified by a user inputting only translation amounts in the units of millimeters. This eliminates the need for a user to be conscious of the tilt angle, thus allowing for intuitive input. Thus, Step S104 causes the HDD 604 of the sensor control device 600 to store the thresholds δ and Δ. The above-described step S101 to S104 are preparation works which can be performed offline, and thus may be performed with another computer which is not connected to the robot system 100.

Next, the stereo camera 300 is attached to the robot hand 202 (S105). Specifically, Step S105 causes the robot hand 202 to hold the stereo camera 300. For example, a user performs jog feed of the robot arm 201 by using the teaching pendant 800 so that the palm unit 210 of the robot hand 202 faces upward, and then places the stereo camera 300 on the palm unit 210. The user then operates the teaching pendant 800, and causes the fingers 211 and 212 of the robot hand 202 to close to chuck the stereo camera 300.

Next, the robot 200, that is, the robot arm 201 is moved so that the robot arm 201 takes a posture in which the teaching is started (S106: motion step, motion process). The posture of the robot 200 in which the teaching is started is a posture in which the field of view of the stereo camera 300 contains the workpiece holding jig 400, which is a measured object. That is, the robot 200, that is, the robot arm 201 may take any posture as long as the stereo camera 300 can capture an image of the marks MK1 to MK3 of the workpiece holding jig 400. In this case, the CPU 501 may move the robot 200 depending on a command obtained when a user operates the teaching pendant 800, or may move the robot 200 into a posture which has been set in advance by an off-line teaching or the like. After moving the robot 200 to a teach point, if the marks MK1 to MK3 are positioned outside the field of view of the stereo camera 300, a user can perform jog feed of the robot arm 201 while checking the image of the stereo camera 300 on the display 700. Step S106 allows the field of view of the stereo camera 300 to contain the three marks, MK1 to MK3.

Figure 7:
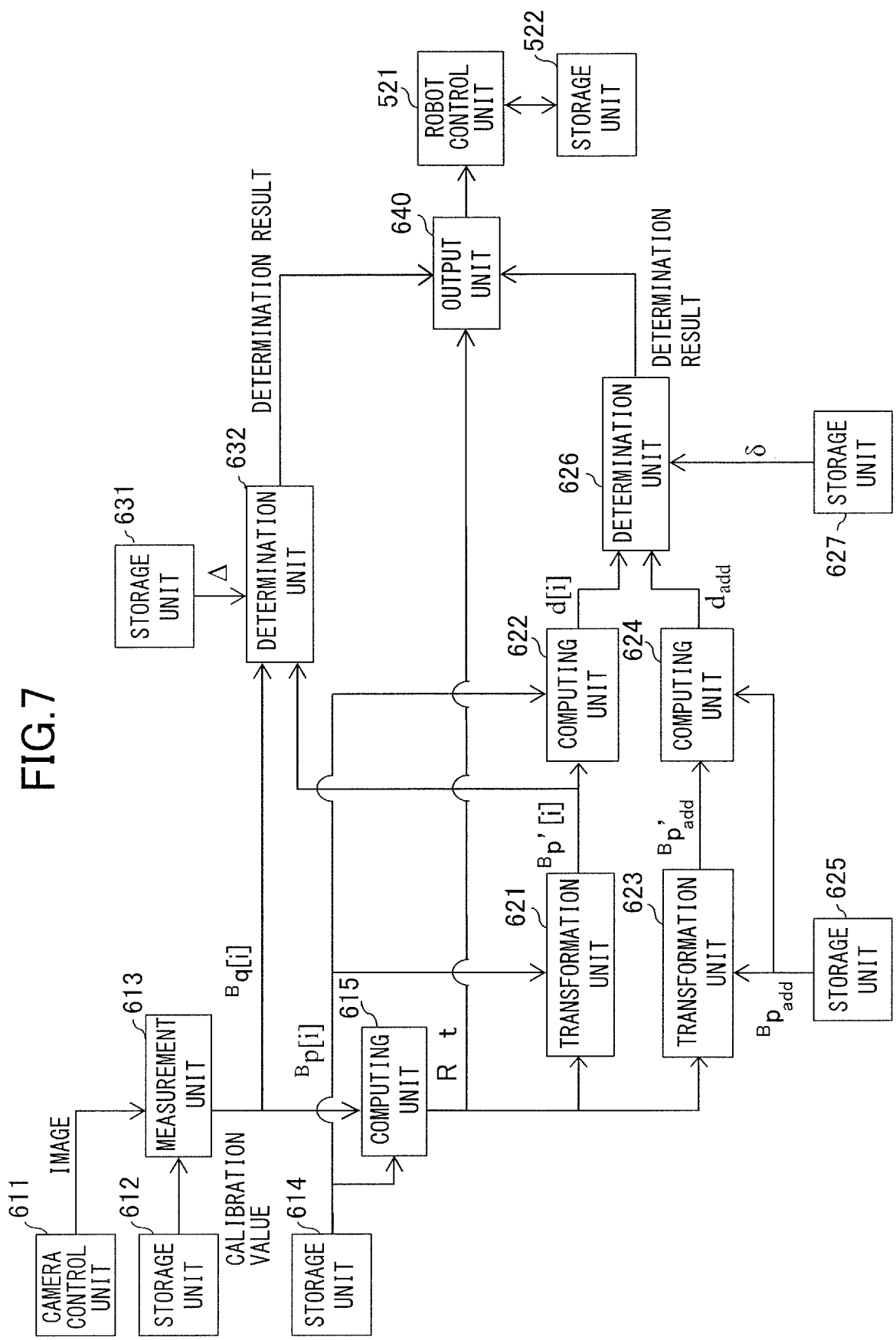
FIG. 7 is a functional block diagram of a robot control device and a sensor control device of the first embodiment.

FIG. 7 is a functional block diagram of the robot control device 500 and the sensor control device 600 of the first embodiment. The CPU 501 of the robot control device 500 illustrated in FIG. 1 functions as a robot control unit 521 illustrated in FIG. 7. The HDD 504 of the robot control device 500 illustrated in FIG. 1 functions as a storage unit 522 illustrated in FIG. 7. The storage unit 522 stores the teach point information 511. The CPU 601 of the sensor control device 600 illustrated in FIG. 1 functions as a camera control unit 611, a measurement unit 613, a computing unit 615, a transformation unit 621, a computing unit 622, a transformation unit 623, a computing unit 624, a determination unit 626, a determination unit 632, and an output unit 640 illustrated in FIG. 7. The HDD 604 of the sensor control device 600 illustrated in FIG. 1 functions as a storage unit 612, a storage unit 614, a storage unit 625, a storage unit 627, and a storage unit 631 illustrated in FIG. 7. The storage unit 612 stores the calibration values. The storage unit 614 stores the target coordinate values $^B p(i)$ (i=1 to 3) of the marks MK1 to MK3, which are the feature points. The storage unit 625 stores the coordinate value $^B p_{add}$ of the determination point. The storage unit 627 stores the threshold δ. The storage unit 631 stores the threshold Δ.

Figure 8:
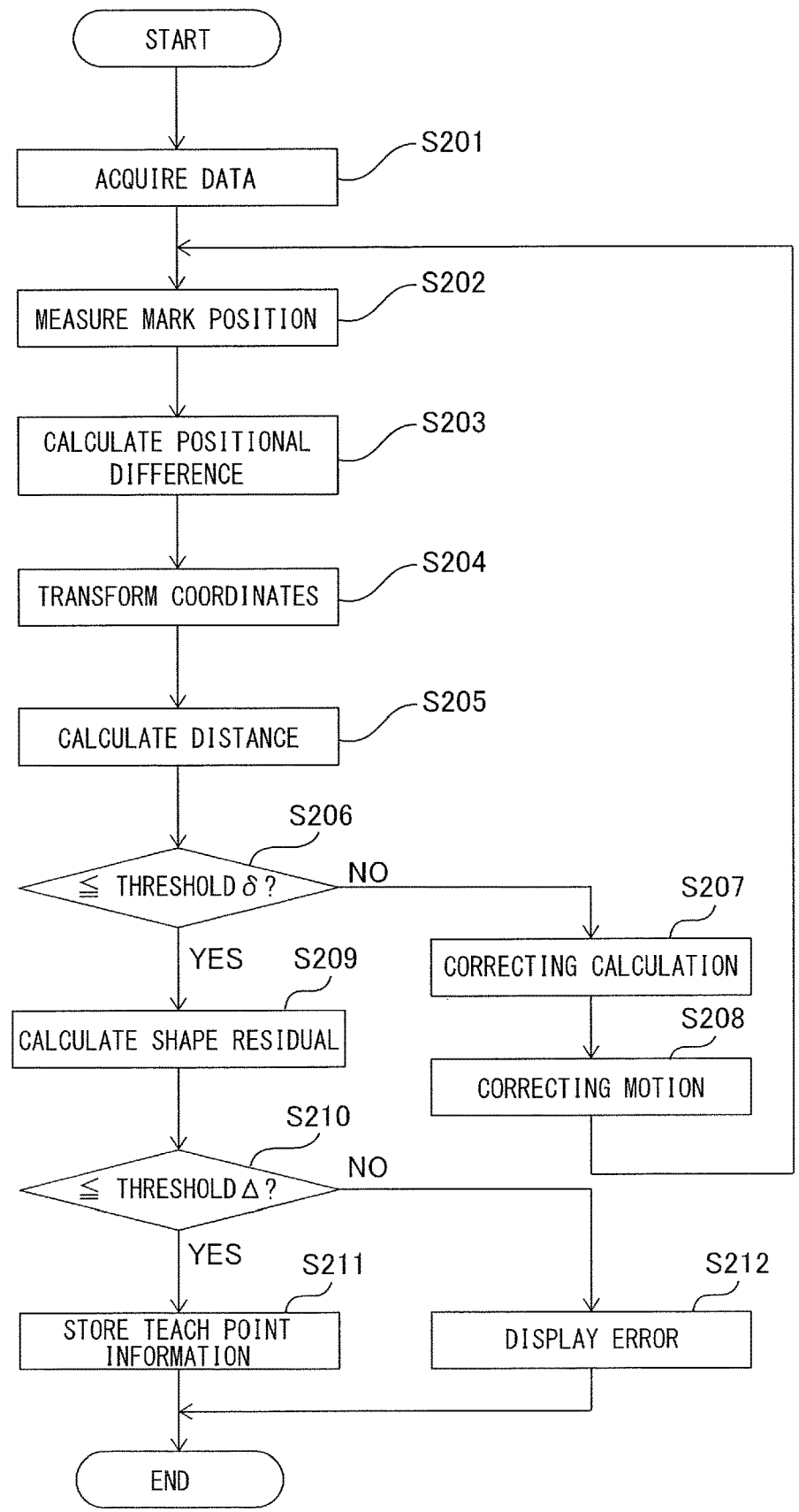
FIG. 8 is a flowchart of teaching work of the first embodiment.

FIG. 8 is a flowchart of teaching work of the first embodiment. In the first embodiment, for stable assembly work by the robot 200, the robot hand 202 is positioned with respect to the workpiece holding jig 400; and the posture of the robot 200, that is, the robot arm 201 taken when the robot hand 202 is positioned is stored as a teach point. First, the measurement unit 613 obtains, as calibration values, the camera internal parameter, the camera external parameter, the rotation matrix $R_C$, and the translation vector $t_C$ from the storage unit 612. The computing unit 615, the transformation unit 621, and the computing unit 622 obtain the target coordinate values $^B p(i)$ (i=1 to 3) of the marks MK1 to MK3 from the storage unit 614. The transformation unit 623 and the computing unit 624 obtain the coordinate value $^B p_{add}$ of the determination point from the storage unit 625. The determination unit 626 obtains the threshold δ from the storage unit 627. The determination unit 632 obtains the threshold Δ from the storage unit 631. That is, the CPU 601 obtains various parameters including the target coordinate values $^B p(i)$ (i=1 to 3) of the marks MK1 to MK3 and the coordinate value $^B p_{add}$ of the determination point, by reading those parameters from the HDD 604 (S201: obtaining step, obtaining process).

Then, the measurement unit 613 obtains positions of the marks MK1 to MK3 with respect to the base coordinate system B, that is, obtains the measured coordinate values through the measurement using the stereo camera 300 (S202: measurement step, measurement process). Specifically, the camera control unit 611 sends an imaging command to the stereo camera 300, causes the stereo camera 300 to capture images of the workpiece holding jig 400 each containing the marks MK1 to MK3, and obtains the images from the stereo camera 300. Through this operation, the measurement unit 613 obtains the images (stereo images) captured by both the camera 301 and the camera 302. The measurement unit 613 performs an image processing and a stereo calculation process on the stereo images obtained from the camera control unit 611, and determines measured coordinate values of the marks MK1 to MK3.

The image processing for measuring the positions of the marks MK1 to MK3 can use a variety of known methods. For example, the image processing performs an edge extraction process on each of the stereo images, and uses shape feature values, such as circularity and circumradius of the extracted edge, to select only the edges of the marks MK1 to MK3. Then, the image processing performs an ellipse fitting process on the edges of the marks MK1 to MK3 on the images, and determines pixel coordinates of the center points of the marks MK1 to MK3. Here, not the circle fitting process but the ellipse fitting process is used, because the circular marks MK1 to MK3 can be deformed and have an ellipse-like shape when images of the marks are captured, due to the relative arrangement of the stereo camera 300 to the marks MK1 to MK3. After determining the pixel coordinates of the center points of the circles of the marks MK1 to MK3, the image processing associates the pixel coordinates of the image captured by the camera 301, with the pixel coordinates of the image captured by the camera 302; and calculates three-dimensional coordinate values. The image processing can calculate coordinate values of the marks MK1 to MK3 with respect to the sensor coordinate system V, by using the camera internal parameters and the camera external parameter of the cameras 301 and 302. The coordinate values are expressed as $^V q(i)$ (i=1 to 3).

The measurement unit 613 then uses the rotation matrix $R_C$ and the translation vector $t_C$, and coordinate-transforms the coordinate values $^V q(i)$ (i=1 to 3) of the marks MK1 to MK3 measured by using the stereo camera 300, to the coordinate values $^B q(i)$ (i=1 to 3) with respect to the base coordinate system B. That is, the measurement unit 613 determines the measured coordinate values $^B q(i)$ (i=1 to 3) by using the following expression (4), as a result of the measurement using the stereo camera 300.

$$^B q[i] = R_C \cdot {}^V q[i] + t_C \; (i=1,2,3) \qquad (4)$$

Figure 9:
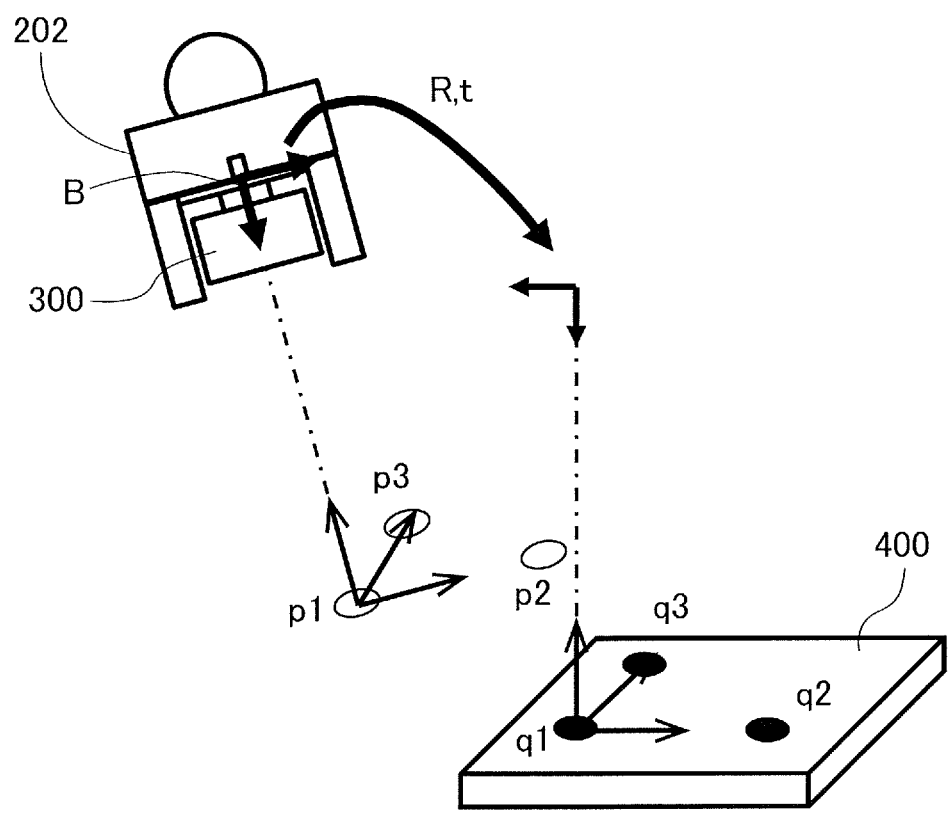
FIG. 9 is a schematic diagram for illustrating a relationship between target coordinate values and measured coordinate values of feature points.

Next, the coordinate value of the determination point is transformed (computing step, computing process). Hereinafter, this process will be specifically described. First, the computing unit 615 calculates the amount of positional difference between the target value and the measured value (S203). Specifically, the computing unit 615 determines, in Step S203, a rotation matrix R, which is a coordinate transformation matrix, and a translation vector t (first computing step, first computing process). The rotation matrix R and the translation vector t indicate the amount of positional difference between the target coordinate values $^B p(i)$ and the measured coordinate values $^B q(i)$. FIG. 9 is a schematic diagram for illustrating a relationship between the target coordinate values $^B p(i)$ and the measured coordinate values $^B q(i)$ of the feature points. In FIG. 9, the target coordinate values $^B p(i)$ (i=1 to 3) are expressed as p1, p2, and p3, and the measured coordinate values $^B q(i)$ (i=1 to 3) are expressed as q1, q2, and q3. The computing unit 615 determines the rotation matrix R and the translation vector t used to perform a coordinate transformation so that the target coordinate values p1, p2, and p3 completely overlap with the measured coordinate values q1, q2, and q3.

Where a coordinate system B' is a coordinate system obtained after the base coordinate system B moves by the rotation matrix R and the translation vector t, target coordinate values $^B p'(i)$ obtained after the base coordinate system B moves are expressed as the following expression (5).

$$^B p'[i] = R \cdot {}^B p[i] + t \; (i=1,2,3) \qquad (5)$$

Thus, in order to move the base coordinate system B so that the target coordinate values $^B p'(i)$ obtained after the base coordinate system B moves are equal to the measured coordinate values $^B q(i)$ of the marks MK1 to MK3, least squares solutions of the rotation matrix R and the translation vector t are determined so that the following expression (6) has the minimum value. That is, because the measured coordinate values $^B q(i)$ of the marks MK1 to MK3 have measurement errors which depend on the stereo camera 300 and the individual difference of the marks MK1 to MK3 and which differs from each other, the least squares solutions of the rotation matrix R and the translation vector t are determined. Here, N is the number of the marks which are the feature points, and i is an integer from 1 to N. That is, the computing unit 615 determines the rotation matrix R and the translation vector t so that the expression (6) has the minimum value.

$$\sum_{i=1}^{N} |{}^B q[i] - (R \cdot {}^B p[i] + t)|^2 \qquad (6)$$

The computation can be performed by using the same method as that used for the calibration between base and camera, and for the matching problem between the point groups. With the above-described computing process, the rotation matrix R and the translation vector t which indicate the positional difference of the base coordinate system B are determined.

The transformation unit 621 coordinate-transforms the target coordinate values $^B p(i)$ (i=1 to 3) of the marks MK1 to MK3 by using the rotation matrix R and the translation vector t. That is, the transformation unit 621 performs computation indicated by the following expression (7), and determines the target coordinate values $^B p'(i)$ (i=1 to 3) obtained after the coordinate transformation. Specifically, the transformation unit 621 determines the target coordinate values $^B p'(i)$ obtained after the coordinate transformation, by performing multiplication of the rotation matrix R and the target coordinate values $^B p(i)$ of the feature points, and then performing addition of the calculation result and the translation vector t.

$$^B p'[i] = R \cdot {}^B p[i] + t \quad (i=1,2,3) \qquad (7)$$

The transformation unit 623 coordinate-transforms the coordinate value $^B p_{add}$ of the determination point by using the rotation matrix R and the translation vector t. That is, the transformation unit 623 performs computation indicated by the following expression (8), and determines the coordinate values $^B p'_{add}$ obtained after the coordinate transformation. Specifically, the transformation unit 623 determines the coordinate values $^B p'_{add}$ obtained after the coordinate transformation, by performing multiplication of the rotation matrix R and the coordinate values $^B p_{add}$ of the determination point, and then performing addition of the calculation result and the translation vector t.

$$^B p_{add}' = R \cdot {}^B p_{add} + t \qquad (8)$$

As described above, the transformation units 621 and 623 coordinate-transforms, in Step S204, the target coordinate values $^B p(i)$ (i=1 to 3) and the coordinate value $^B p_{add}$, by using the rotation matrix R and the translation vector t.

The computing units 622 and 624 determine distances between points which are obtained before and after the coordinate transformation (S205: second computing step, second computing process). The determination unit 626 performs a convergence determination (S206). Specifically, the computing unit 622 determines, in Step 205, distances between the target coordinate values of the feature points obtained before and after the coordinate transformation. The computing unit 624 determines, in Step 205, distances between the coordinate values of the determination points obtained before and after the coordinate transformation. That is, the computing unit 622 determines distances d(i) (i=1 to 3) between the target coordinate values $^B p(i)$ (i=1 to 3) of the feature points obtained before the coordinate transformation and the target coordinate values $^B p'(i)$ (i=1 to 3) of the feature points obtained after the coordinate transformation, by using the following expression (9).

$$d[i] = |{}^B p'[i] - {}^B p[i]| \quad (i=1,2,3) \qquad (9)$$

Thus, the computing unit 622 determines, in step S205, the distances d(i) between the points, by computing norms of difference vectors between the points obtained before and after the coordinate transformation.

The computing unit 624 determines a distance $d_{add}$ between the coordinate value $p_{add}$ of the determination point obtained before the coordinate transformation and the coordinate value $p'_{add}$ of the determination point obtained after the coordinate transformation, by using the following expression (10). This distance $d_{add}$ is a converted amount of positional distance which is obtained by converting the amount of positional difference between the target coordinate values and the measured coordinate values, to the position of the determination point.

$$d_{add} = |{}^B p'_{add} - {}^B p_{add}| \qquad (10)$$

Thus, the computing unit 624 determines, in step S205, the distance $d_{add}$ between the points, by computing a norm of a difference vector between the points obtained before and after the coordinate transformation. That is, in a case where the determination point is a point other than the origin of the base coordinate system B, the transformation unit 623 coordinate-transforms the coordinate value $^B p_{add}$ of the determination point by using the rotation matrix R and the translation vector t, depending on the expression (8). Then, the computing unit 624 determines the distance $d_{add}$ between the coordinate value $p_{add}$ of the determination point obtained before the coordinate transformation and the coordinate value $p'_{add}$ of the determination point obtained after the coordinate transformation, by using the expression (10). In a case where the determination point is the origin of the base coordinate system B, the computing unit 624 can determine the distance $d_{add}$ of the points by determining the norm |t|, that is, the length of the translation vector t. That is, $d_{add} = |t|$. In this case, the coordinate transformation process by the transformation unit 623 can be omitted, and the computation load is reduced.

The determination unit 626 compares, in Step S206, the distances d(i) (i=1 to 3) and $d_{add}$ with the threshold δ, and determines whether the distances converge. That is, the determination unit 626 determines whether the following expression (11) holds. That is, the determination unit 626 uses the inequality (11) and determines whether the posture of the robot 200 needs to be corrected, that is, whether the correction is required (determination step, determination process). If the inequality (11) does not hold, the posture of the robot 200 needs to be corrected. If the inequality (11) holds, the posture of the robot 200 needs not to be corrected. The expression (11) contains the coordinate values of the determination point obtained after the coordinate transformation, and thus the determination on the need of the correction is performed based on the coordinate values of the determination point obtained after the coordinate transformation.

$$\max\left[\left(\max_{i=1,2,3} d[i]\right), d_{add}\right] \leq \delta \qquad (11)$$

In the first embodiment, the determination unit 626 uses all the points of the feature points and the determination point, and determines whether all the distances d(i) and $d_{add}$ between the points obtained before and after the coordinate transformation are equal to or smaller than a first threshold, that is, the threshold δ. If all the distances, d(i) and $d_{add}$, between the points are equal to or smaller than the threshold δ, the distances converge. If at least one of the distances, d(i) and $d_{add}$, between the points exceeds the threshold δ, the distances do not converge. Thus, if the distance $d_{add}$ exceeds the threshold δ, the distances do not converge.

FIGS. 10A, 10B, 10C, and 10D are schematic diagrams for describing Steps S202 to S205 of FIG. 8. Here, although the process is performed for three-dimensional point groups in the first embodiment, FIGS. 10A to 10D illustrate the point groups in two dimensions for convenience, and illustrate only two feature points of the three feature points. In addition, structures such as the robot hand 202 are not illustrated, and only the coordinate system and the feature points are illustrated in the figures. In FIGS. 10A to 10D, "x" marks indicates the coordinate value $p_{add}$ of the determination point obtained before the coordinate transformation, the coordinate value $p'_{add}$ of the determination point obtained after the coordinate transformation, the coordinate values p1 and p2 of the feature points obtained before the coordinate transformation, and the coordinate values p1' and p2' of the feature points obtained after the coordinate transformation. Also in FIGS. 10A to 10D, the measured coordinate values of the feature points q1 and q2 are indicated by black dots. The target coordinate value p1, the target coordinate value p2, and the origin of the base coordinate system B are connected with each other by a broken line to facilitate the understanding that these points are moved as one body.

Figure 10A:
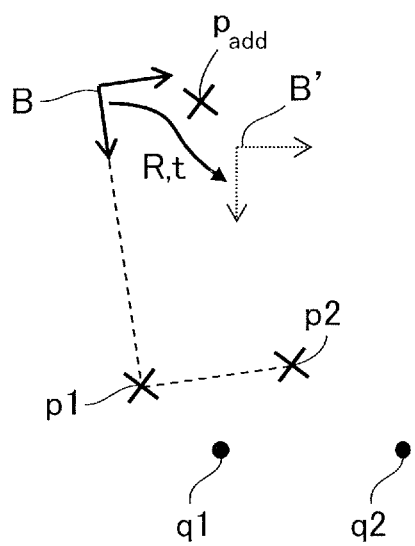
FIG. 10A is a schematic diagram illustrating a relationship between a coordinate value of a determination point, target coordinate values, and measured coordinate values.
Figure 10B:
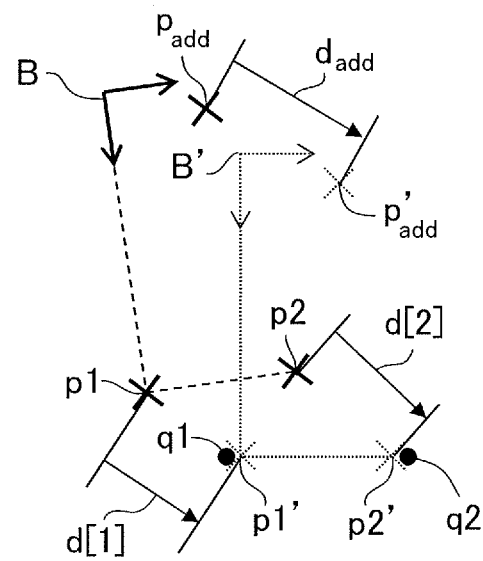
FIG. 10B is a schematic diagram illustrating coordinate values obtained after a coordinate transformation.
Figure 10C:
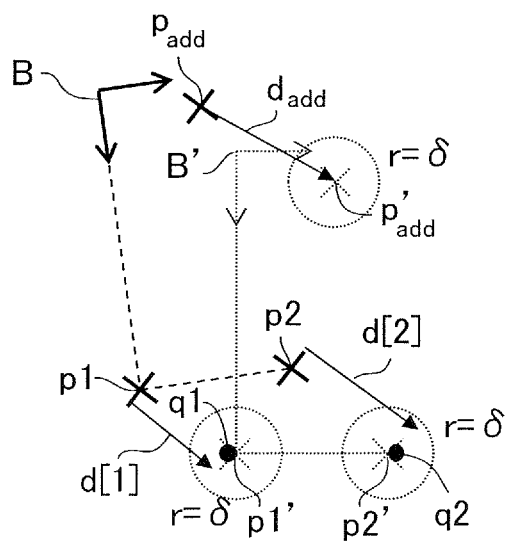
FIG. 10C is a schematic diagram illustrating a relationship between coordinate values in a state of non-convergence.
Figure 10D:
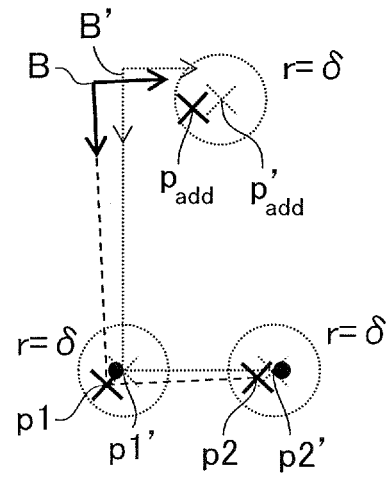
FIG. 10D is a schematic diagram illustrating a relationship between coordinate values in a state of convergence.

The process determines the rotation matrix R and the translation vector t, as illustrated in FIG. 10A; and determines the coordinate values $p'_{add}$, p1', and p2' obtained after the coordinate transformation, as illustrated in FIG. 10B. The process then determines the distance d(1) between the coordinate values p1 and p1', the distance d(2) between the coordinate values p2 and p2', and the distance $d_{add}$ between the coordinate values $p_{add}$ and $p'_{add}$. As illustrated in FIG. 10C, if at least one of the distances d(1), d(2), and $d_{add}$ exceeds the threshold δ, that is, if at least one of the points obtained before the coordinate transformation exceeds a corresponding one of spheres which have center points equal to the points p1', p2', and $p'_{add}$ obtained after the coordinate transformation and have a radius r equal to the threshold δ, the distances do not converge. As illustrated in FIG. 10D, if all of the distances d(1), d(2), and $d_{add}$ are equal to or smaller than the threshold δ, that is, if all of the points obtained before the coordinate transformation are within corresponding spheres which have the center points equal to the points p1', p2', and $p'_{add}$ obtained after the coordinate transformation and have the radius r equal to the threshold δ, the distances converge.

If at least one of the distances d(1), d(2), and $d_{add}$ exceeds the threshold δ in Step S206 (S206: No), that is, if the distances do not converge, the output unit 640 outputs the determination result, the rotation matrix R, and the translation vector t to the robot control unit 521. The robot control unit 521 determines a posture command (S207), which causes the robot 200, that is, the robot arm 201 to take a posture, depending on the rotation matrix R and the translation vector t; and corrects the posture of the robot 200 (S208), that is, the robot arm 201, in accordance with the posture command. Here, the correction of the posture of the robot 200, that is, the robot arm 201 corresponds to the correction of the leading end of the robot 200 in the robot coordinate system O, that is, the correction of the position and orientation of the robot hand 202.

Hereinafter, the calculation in Step S207 will be specifically described. In the robot control device 500, there is set the tool coordinate system T whose origin is the leading end of the robot 200, that is, the robot hand 202. In addition, there is also preset the position and orientation of the base coordinate system B with respect to the tool coordinate system T. Here, the position and orientation of the tool coordinate system T with respect to the robot coordinate system O is expressed as a matrix $^{O}H_{T}$. In addition, the position and orientation of the base coordinate system B with respect to the tool coordinate system T is expressed as a matrix $^{T}H_{B}$. If the posture of the robot 200 taken after the correction is expressed as a matrix $^{O}H_{T'}$, the matrix $^{O}H_{T'}$ can be expressed by the following expression (12).

$$^{O}H_{T'} = {^{O}H_{T}} \cdot {^{T}H_{B}} \cdot {^{B}H_{B'}} \cdot ({^{T}H_{B}})^{-1} \quad (12)$$

The matrix $^{B}H_{B'}$ is a homogeneous transformation matrix which is calculated by using the rotation matrix R and the translation vector t calculated in Step S203, and which expresses a coordinate transformation from a current position of the base coordinate system B to the measured position. The matrix $^{B}H_{B'}$ is expressed by the following expression (13).

$$^{B}H_{B'} = \begin{bmatrix} R & t \\ 0 & 1 \end{bmatrix} \quad (13)$$

That is, in Step S207, the robot control unit 521 uses the expressions (12) and (13), and calculates the matrix $^{O}H_{T'}$ which expresses the position and orientation of the leading end of the robot 200. The robot control unit 521 then uses the matrix $^{O}H_{T'}$, and calculates a posture command for the robot 200, that is, an angle command for each of the joints of the robot arm 201. The robot control unit 521 then moves the robot 200, in Step S208, in accordance with the posture command; and corrects the posture of the robot 200 (correcting motion step, correcting motion process).

After correcting the posture of the robot 200, the process performs steps S202 to S205 again, and performs the convergence determination in Step S206 by using the threshold δ. If the distances do not converge in Step 206, the process performs the steps S207, S208, and S202 to S205 again. Thus, the process repeats the steps S202 to S208 until all of the distances d(1), d(2), and $d_{add}$, which are between the points, become equal to or smaller than the threshold δ and converge. That is, the process repeatedly causes the robot 200 to perform the correcting motion of the robot 200. Since the motion of the robot arm 201 and the measurement by the stereo camera 300 have errors, the teaching is often not completed by a single correcting motion. The first embodiment, however, can position the robot hand 202 with high accuracy, by repeatedly performing the correcting motion. In addition, an upper limit for the number of the repetitions may be set. In this case, if the distances do not converge when the number of the repetition exceeds the upper limit, the process may end, as timeout.

Figure 11A:
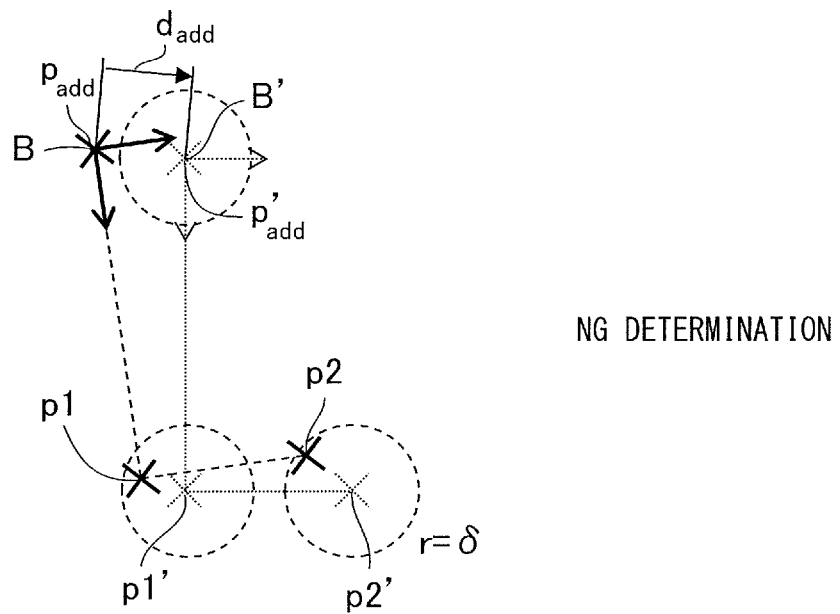
FIG. 11A is a schematic diagram illustrating an example of a relationship between coordinate values, in a case where an NG determination is performed in a determination process of the first embodiment.
Figure 11B:
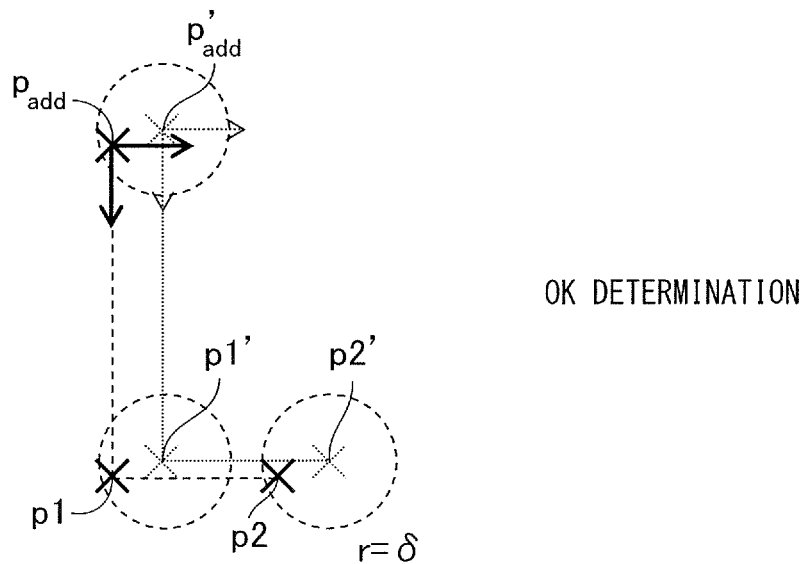
FIG. 11B is a schematic diagram illustrating an example of a relationship between coordinate values, in a case where an OK determination is performed in the determination process of the first embodiment.
Figure 12A:
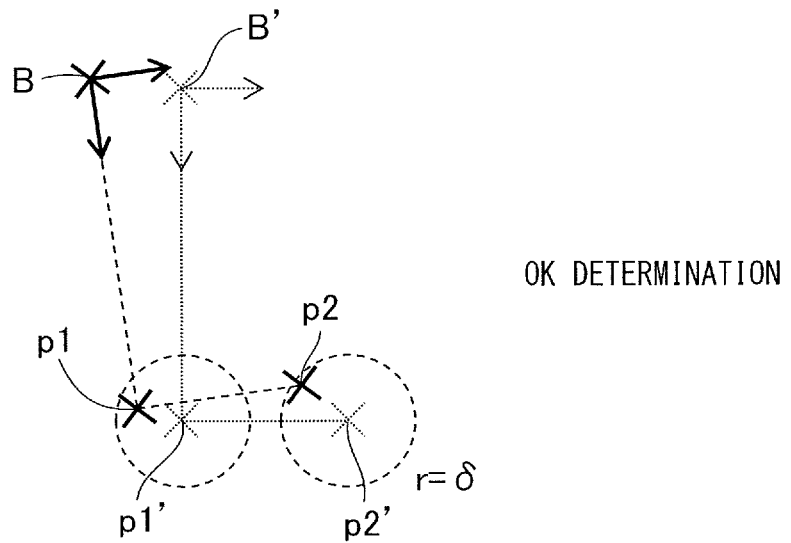
FIG. 12A is a schematic diagram illustrating an example of a relationship between coordinate values, in a case where an OK determination is performed in a determination process of a comparative example.
Figure 12B:
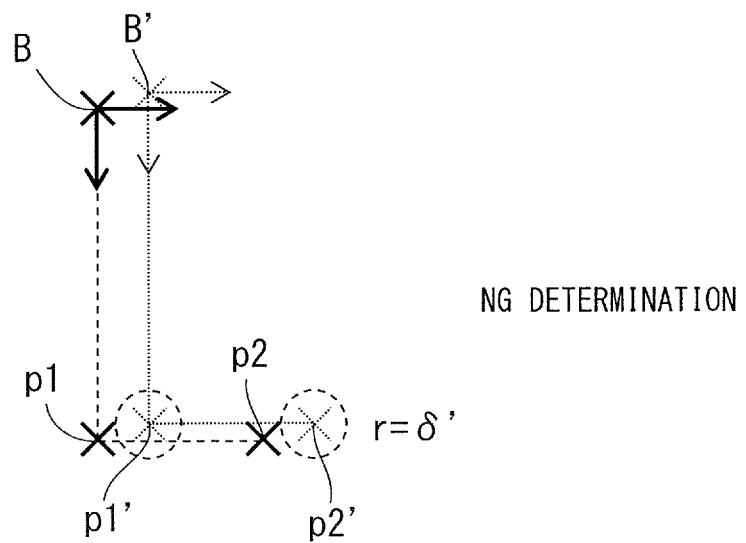
FIG. 12B is a schematic diagram illustrating an example of a relationship between coordinate values, in a case where an NG determination is performed in the determination process of the comparative example.

FIGS. 11A and 11B are schematic diagrams for illustrating a determination process of the first embodiment. FIGS. 12A and 12B are schematic diagrams for illustrating a determination process of a comparative example. The comparative example performs the determination process without using the determination point. Here, a relative position between the stereo camera 300 and the marks MK1 to MK3 in FIG. 11A is the same as that in FIG. 12A, for comparison. Similarly, the relative position in FIG. 11B is the same as that in FIG. 12B. In FIGS. 11A and 11B, the determination point is the origin of the base coordinate system B.

In the comparative example, as illustrated in FIG. 12A, since the distance d(1) between the coordinate values p1 and p1', and the distance d(2) between the coordinate values p2 and p2' are equal to or smaller than the threshold δ, the process determines that the distances converge, that is, determines the state as "OK", even when the stereo camera 300 tilts with respect to the marks MK1 to MK3. In the first embodiment, however, as illustrated in FIG. 11A, even when the distance d(1) between the coordinate values p1 and p1', and the distance d(2) between the coordinate values p2 and p2' are equal to or smaller than the threshold δ, the distance $d_{add}$ between the coordinate values $p_{add}$ and $p'_{add}$ of the determination point exceeds the threshold δ. In this case, because the stereo camera 300 tilts with respect to the marks MK1 to MK3, the process determines in the first embodiment that the distances do not converge, that is, determines the state as "NG". As a result, the process will cause the robot 200 to repeatedly perform the correcting motion of the robot 200. Thus, the process can position the robot hand 202 with respect to the marks MK1 to MK3, within a predetermined precision range.

In the comparative example, which uses the determination method without any determination point, if the robot hand 202 is required to be positioned within a predetermined precision range, another threshold δ' which is smaller than the threshold δ is required to be set, as illustrated in FIG. 12B. In this case, the calculation of the appropriate threshold by a user takes time. In addition, since the threshold δ' which is smaller than the threshold δ is required to be set, the determination for the convergence also takes time. This needs additional time for the repetitive motion, causing slow convergence. In contrast, the addition of the determination point as illustrated in FIG. 11B allows the distances d(1), d(2), and $d_{add}$ to quickly converge to the threshold δ, without setting the threshold δ smaller as in the comparative example. This allows the process to quickly perform a next operation. Therefore, the robot hand 202 can be quickly positioned with respect to the marks MK1 to MK3 with high accuracy, by coordinate-transforming the determination point by calculation, and by performing the convergence determination on the coordinate-transformed determination point.

The first embodiment uses the additional determination point used for the convergence determination. The additional point is an imaginary point. In addition, the first embodiment uses the rotation matrix R and the translation vector t, and determines the distance $d_{add}$ between the coordinate value $^B p_{add}$ of the determination point obtained before the coordinate transformation and the coordinate value $^B p'_{add}$ of the determination point obtained after the coordinate transformation. The measured coordinate values $^B q(i)$ of feature points have measurement errors, which depend on the stereo camera 300 and the individual differences of the marks MK1 to MK3 and which differs from each other. When a variation in the measurement errors is large, the distances between the target coordinate values $^B p(i)$ of the feature points and the measured coordinate values $^B q(i)$ may not converge to the threshold δ, if used for the convergence determination. For this reason, in order to increase the accuracy of the determination which is performed for the feature points by using the threshold δ, it is preferable to determine the distances between the target coordinate values $^B p(i)$ obtained before the coordinate transformation and the target coordinate values $^B p'(i)$ obtained after the coordinate transformation, as is for the determination point. Thus, in the first embodiment, the distances between the target coordinate values $^B p(i)$ obtained before the coordinate transformation and the target coordinate value $^B p'(i)$ obtained after the coordinate transformation are also determined for the feature points as indexes used for the convergence determination, as is for the determination point. Thus, since the target coordinate values $^B p(i)$ of the feature points and the coordinate value $^B p_{add}$ of the determination point obtained before the coordinate transformation are merely coordinate-transformed, by calculation, to the target coordinate values $^B p'(i)$ of the feature points and the coordinate value $^B p'_{add}$ of the determination point obtained after the coordinate transformation, the former is congruent to the latter. Thus, since the process performs the convergence determination for the feature points and the determination point by using the same indexes, that is, the distances between the points obtained before and after the coordinate transformation, the determination result is less affected by disturbance factors, such as the measurement errors of the stereo camera 300. That is, even when the variation in the measurement errors of the feature points is large, since the process performs the convergence determination using the distances d(i) of the points obtained before and after the coordinate transformation, as well as the distance of the determination point, the process allows the distances to converge more reliably.

If the process determines, in Step S206, that all of the distances d(i) and $d_{add}$ are equal to or smaller than the threshold (Step S206: Yes), that is, if the distances converge, the determination unit 632 performs calculation (S209) and determination (S210) of a shape residual to check the reliability of the result of the teaching. The determination unit 632 computes an index which indicates a degree of coincidence between the design shape and the measured shape of the measured object, depending on the target coordinate values and the measured coordinate values of the marks MK1 to MK3 measured by the stereo camera 300. Specifically, the determination unit 632 computes distances e(i) between the measured coordinate values $^B q(i)$ of the marks MK1 to MK3 and the target coordinate values $^B p'(i)$ of the marks MK1 to MK3 obtained after the coordinate transformation, by using the following expression (14).

$$e[i] = |^B q[i] - ^B p'[i]| (i=1,2,3) \qquad (14)$$

Here, the target coordinate values $^B p'(i)$ obtained after the coordinate transformation has been coordinate-transformed so that the target coordinate values of the design shape completely overlap with the measured coordinate values $^B q(i)$. Thus, the value of e(i) does not change due to a positional difference of the whole of the stereo camera 300. If some error factor increases the distances e(i) between the measured coordinate values $^B q(i)$ and the target coordinate values $^B p'(i)$, the measured shape is deformed with respect to the design shape. This property can be used to evaluate the reliability of a positioning state achieved by the teaching. Thus, the determination unit 632 determines whether the distances e(i) between the measured coordinate values $^B q(i)$ and the target coordinate values $^B p'(i)$ are equal to or smaller than a second threshold, that is, a threshold Δ. More specifically, the determination unit 632 extracts a maximum distance $e_{max}$ from the plurality of distances e(i), as expressed in the expression (15); and determines whether the distance $e_{max}$ is equal to or smaller than the threshold Δ.

$$e_{max} = \max_{i=1,2,3} e[i] \qquad (15)$$

If the distance $e_{max}$ is equal to or smaller than the threshold Δ (S210: Yes), that is, if all the distances e(i) are equal to or smaller than the threshold Δ, the result of the positioning is reliable. Thus, the process sets the posture of the robot 200, taken at the time, as the teach point (S211: setting step, setting process). That is, the robot control unit 521 causes the storage unit 522 to store the current posture of the robot arm 201 as the teach point information 511. If the teach point information 511 has been stored in advance in the storage unit 522, the teach point information 511 may be overwritten. The teach point information 511 may be a command value corresponding to a joint angle of the robot arm 201, or may be a command value corresponding to a position and orientation of the leading end of the robot arm 201. The latter command value may be obtained by using forward kinematics calculation and converting a command value corresponding to a joint angle. The joint angle may be a rotation angle of a motor used to drive a corresponding joint. If the distance $e_{max}$ exceeds the threshold $\Delta$ (S210: No), the positioning state by the teaching is not reliable. Thus, the robot control unit 521 indicates contents of the error to a user without storing the teach point information. Specifically, the robot control unit 521 causes the display 700 to display the contents of the error (S212).

There can be a case where the reliability of the measurement by the stereo camera 300 decreases due to disturbance factors to the stereo camera 300 or aging deterioration of the stereo camera 300, or a case where some error in operation occurs. If the teach point information is stored in the state where the reliability of the measurement remains insufficient, the work start position PA is always displaced in workpiece assembly for production, which causes the robot 200 to frequently stop. For example, the error in operation includes setting error of a calibration value for the stereo camera 300, and installation error of the workpiece holding jig 400. The latter includes a case in which a different type of jig having marks is mistakenly placed at the place where the workpiece holding jig 400 is required to be placed. Examples of the disturbance factors and aging deterioration include a measurement error due to illumination condition or the like, deformation of the stereo camera 300 due to thermal deformation or drop in handling, and distortion of a shape which is produced by connecting the points of the marks MK1 to MK3. This distorsion is caused by distorsion of the workpiece holding jig 400. In the first embodiment, the processes of S210 to S212 can prevent the teach point information for the robot arm 201 from being overwritten, even when the reliability of the measurement by the stereo camera 300 reduces or the error in operation occurs. Therefore, the reliability of the robot system 100 further increases.

As described above, according to the first embodiment, the addition of the determination point allows a worker to intuitively and easily set an appropriate threshold δ required to achieve a desired accuracy, with the worker being not conscious of the complicated computation, such as the calculation of the tilt angle of the robot hand 202 with respect to the marks MK1 to MK3. Thus, the working load of setting a threshold by a worker can be reduced. That is, a user can control the robot 200 so that the tilt angle is within an appropriate tilt range, without being conscious of the numerical value itself of the tilt angle. In particular, when the determination point is set closer to the robot hand 202 or the stereo camera 300 than the marks MK1 to MK3, the tilt of the robot hand 202 with respect to the marks MK1 to MK3 is more effectively corrected, which leads to more quick convergence. When the fitting work for the workpiece W1 and the workpiece W2 is performed by the robot depending on a result of the teaching, the positional accuracy of the workpieces is important at a contact portion at which the workpieces fit to each other. Thus, when the determination point is positioned at a freely-selected point within the region, which is obtained by adding the above-described holding region and an outer shape of a workpiece held by the robot hand, more preferable convergence determination can be performed.

In addition, the convergence determination, which uses the distances between the determination points obtained before and after the coordinate transformation, can shorten the time for the positioning, which has the same accuracy as that in the case where the determination is performed with a threshold using both a translation component and an angle component. Thus, the process can cause the storage unit 522 to store the teach point information 511 as early as the positioning is completed. With this operation, the early teaching allows the robot 200 to perform early production work. This improves productivity, which is achieved by the work of the robot 200.

In the first embodiment, the calibration of the stereo camera 300 is performed with respect to the mechanical references. In addition, although the calibration or the measurement using motion information on the robot arm 201 easily causes errors, the first embodiment uses no control information on the robot arm 201 when the stereo camera 300 is positioned by moving the robot arm 201. That is, the first embodiment evaluates the positional difference state without depending on the control information on the robot arm 201, by using the calibration values, which are calibrated with respect to the positioning pins 321 and 322 of the base portion 311, and by coordinate-transforming the measurement values obtained by the stereo camera 300. As a result, the positioning state of the base portion 311 with respect to the marks MK1 to MK3, and the positioning state of the robot hand 202, which is joined with the base portion 311 via the positioning pins 321 and 322, with respect to the marks MK1 to MK3 can be determined with high accuracy.

Here, the first embodiment uses all of the feature points and the determination point, and determines whether all of the distances, $d(i)$ and $d_{add}$, between the points obtained before and after the coordinate transformation are equal to or smaller than the threshold. This determination is performed so that errors in both the palm unit 210 side and the workpiece holding jig 400 are within a predetermined range. If only the positional accuracy of the palm unit 210 is important, and the accuracy of the posture of the palm unit 210 is not important, the convergence determination may be performed by using only the distance $d_{add}$ between the determination point obtained before the coordinate transformation and the determination point obtained after the coordinate transformation.

Second Embodiment

Figure 13A:
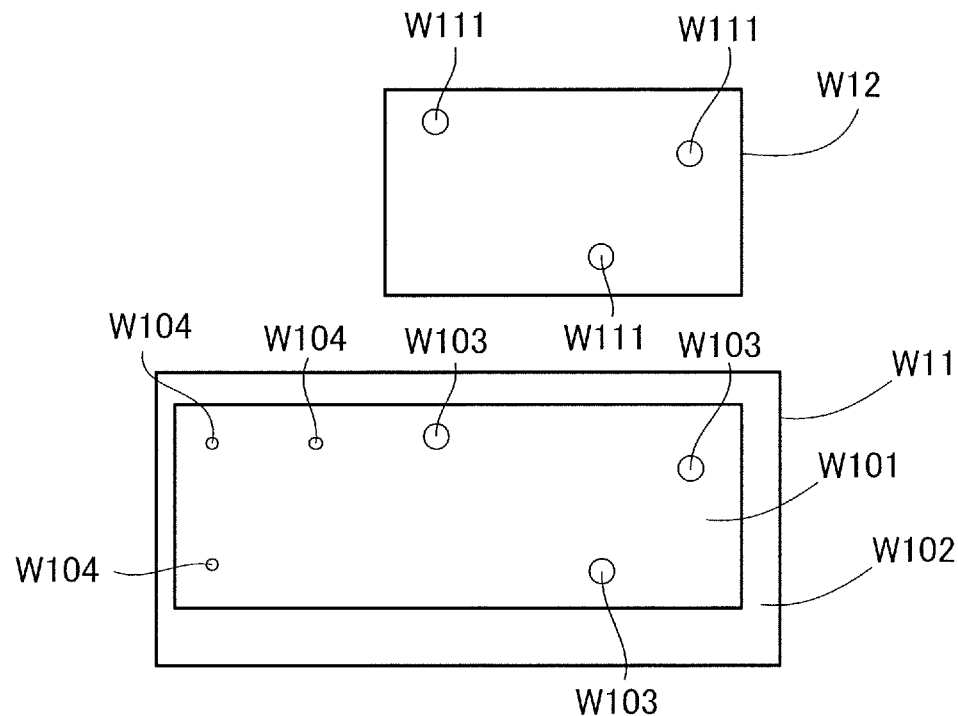
FIG. 13A is an explanatory diagram of a first workpiece and a second workpiece used for assembly work in a second embodiment.
Figure 13B:
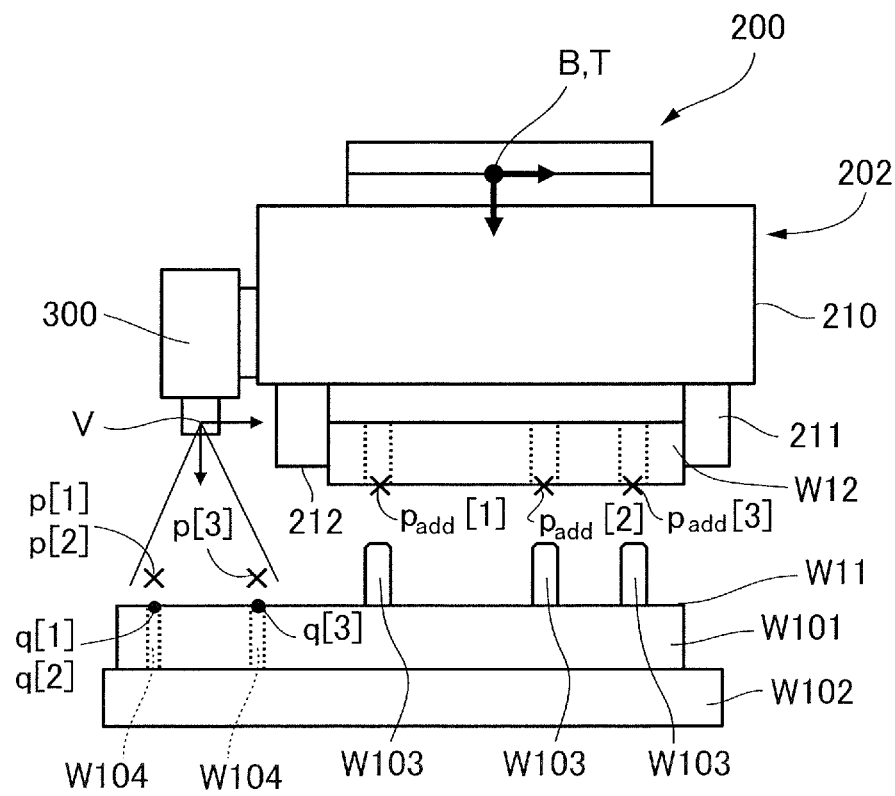
FIG. 13B is a schematic diagram illustrating a configuration of a robot of the second embodiment.

Next, a robot system of a second embodiment of the present embodiment will be described. In the first embodiment, the method of teaching the robot has been described. But in the second embodiment, there is described a method of controlling a robot used when actual production work, such as assembly of components, is performed. FIG. 13A is an explanatory diagram of a first workpiece W11 and a second workpiece W12 used for assembly work in the second embodiment. FIG. 13B is a schematic diagram illustrating a configuration of the robot of the second embodiment. In the second embodiment, the robot 200 performs work of assembling the workpiece W12 to the workpiece W11. The leading end of the robot 200, that is, the palm unit 210 of the robot hand 202 is provided with the stereo camera 300 which is fixed to a side face of the palm unit 210. The stereo camera 300 is fixed to the robot hand 202 in this manner, and thereby supported by the robot 200.

The workpiece W11 is constituted by a first member W101 and a second member W102, which are joined with each other via joining members, such as screws (not illustrated). The position of the second member W102 with respect to the first member W101 varies within a clearance range of screw holes. The first member W101 is provided with three pins W103 formed thereon, and with three reference holes W104 formed therein as feature points. The workpiece W12 is provided with three holes W111 corresponding to the pins W103 of the workpiece W11, and thereby can be assembled to the workpiece W11. The assembly of the workpiece W11 to the workpiece W12 is performed by using the robot 200.

A configuration of the robot system of the second embodiment is substantially the same as the robot system 100 of the first embodiment except that the stereo camera 300 is fixed to the robot hand 202. Here, the robot hand 202 is a parallel gripper which is suitable for holding the workpiece W12. That is, as in the first embodiment, the robot hand 202 includes the palm unit 210, and the pair of fingers 211 and 212 which open and close with respect to the palm unit 210. The stereo camera 300 is positioned so that it can measure the reference holes W104 of the workpiece W11 immediately before a position where the robot hand 202 assembles the workpiece W12 to the workpiece W11. At a position immediately before the position where the assembly is performed, the pins W103 is not contained in the field of view of the stereo camera 300, but the reference holes W104 are contained in the field of view of the stereo camera 300. Thus, the second embodiment indirectly performs the positioning by causing the stereo camera 300 to measure the reference holes W104.

Figure 14:
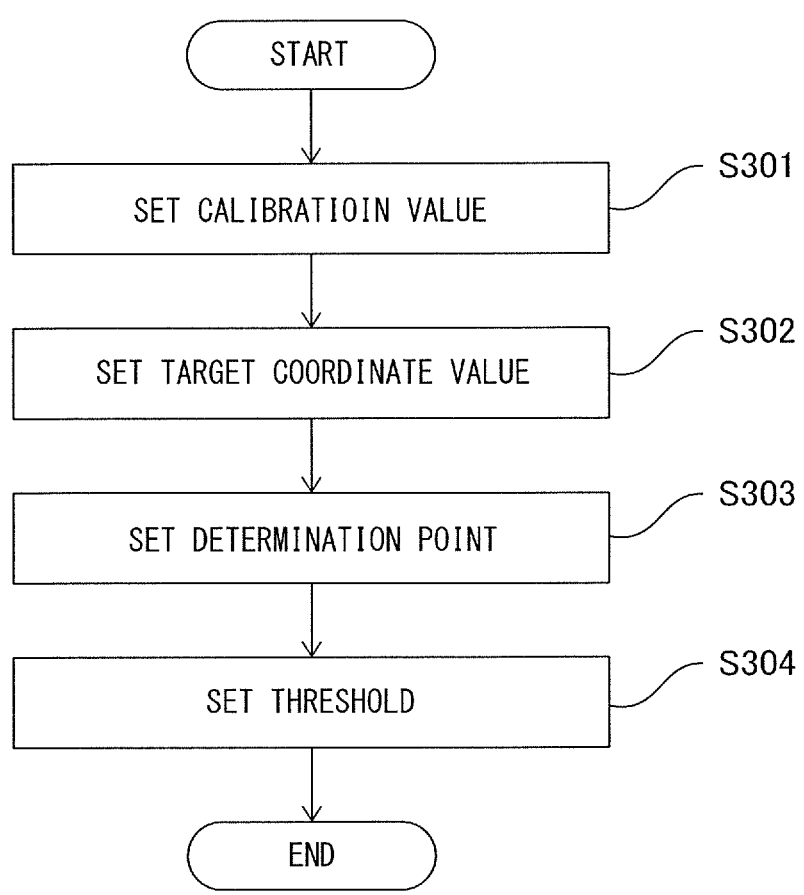
FIG. 14 is a flowchart illustrating an advance preparation for performing assembly work in the second embodiment.

FIG. 14 is a flowchart illustrating an advance preparation for performing assembly work in the second embodiment. Hereinafter, the process will be described along the flowchart of FIG. 14. Here, some features which are common to those of the first embodiment will be omitted as appropriate in the description. First, the process sets a camera calibration value (S301). As is in Step S101 described in the first embodiment, in Step S301, two types of calibration, the stereo camera calibration and the calibration between base and camera, are performed in advance for the calibration values of the stereo camera 300. The stereo camera calibration values are the same as those of the first embodiment. The calibration between base and camera is performed by using a calibration jig which is different from the calibration jig 900 described in the first embodiment.

Figure 15:
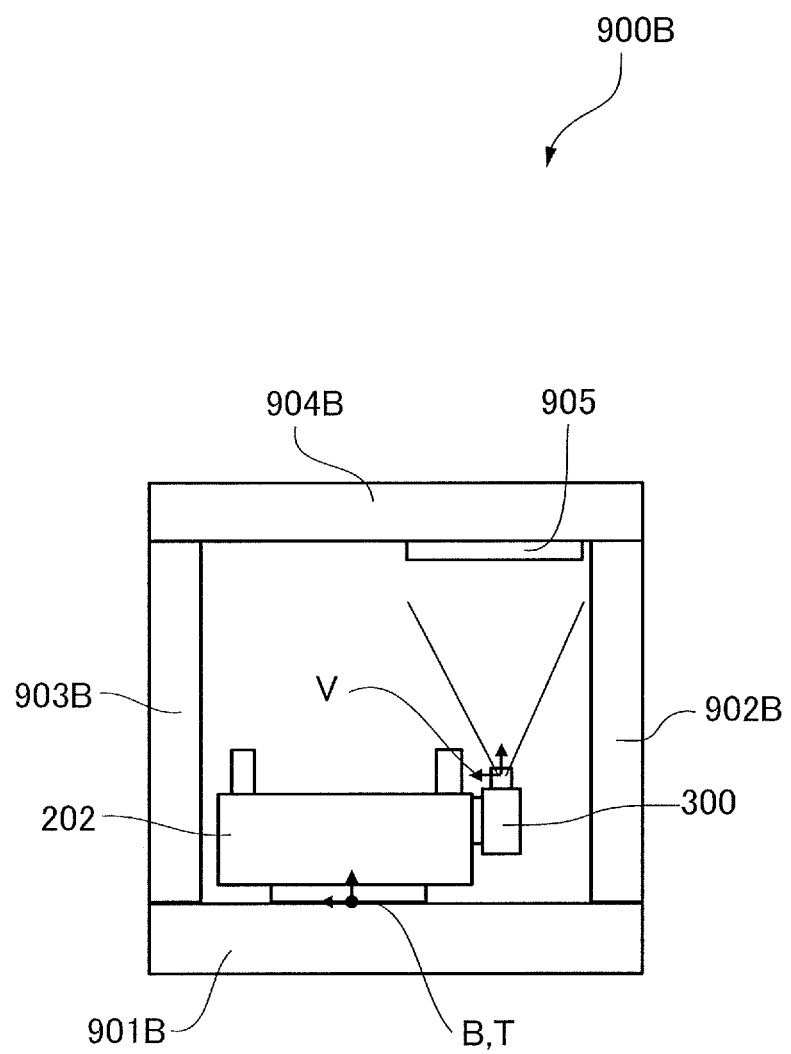
FIG. 15 is an explanatory diagram of a calibration jig used for calibration in the second embodiment.

FIG. 15 is an explanatory diagram of a calibration jig 900B used for the calibration in the second embodiment. The calibration jig 900B includes a base portion 901B, pillar portions 902B and 903B, a top plate portion 904B, and a reference pattern portion 905 which is the same as that of the first embodiment. The base portion 901B and the top plate portion 904B are plate-like members which are disposed facing each other, and joined with each other via the pillar portions 902B and 903B. As illustrated in FIG. 15, the calibration between base and camera is performed by fixing the robot hand 202 and the stereo camera 300 to the calibration jig 900B in a state where the stereo camera 300 is integrated with the robot hand 202, and by causing the stereo camera 300 to capture images of the reference pattern portion 905, which is the same as that of the first embodiment. In the second embodiment, the origin of the base coordinate system B is set as an installation position of the robot hand 202 to the robot arm; that is, the position and orientation of the base coordinate system B is the same as that of the tool coordinate system T. As is in the first embodiment, the process measures a positional relationship between the base coordinate system B and the marks of the reference pattern portion 905, in the calibration jig 900B. With this operation, a relative position and orientation of the sensor coordinate system V to the base coordinate system B can be determined with high accuracy. Here, positions of the fingers 211 and 212 of the robot hand 202 to the base coordinate system B have been mechanically adjusted within a predetermined precision range.

The process then sets target coordinate values (S302). The process sets, as the target coordinate values, target positions, determined in design, for the reference holes W104 with respect to the tool coordinate system T, that is, the base coordinate system B. The target positions are obtained when the robot hand 202 takes its position and orientation immediately before the assembly. For example, the process sets the target coordinate values of positions which are 1 millimeter above positions where the fitting of the holes W111 to the pins W103 is started. Alternatively, there may be used another method in which the robot hand 202 is positioned at a position immediately before assembly of a real sample workpiece, then the positions of the reference holes W104 are stored by the stereo camera 300 capturing images of the reference holes 104, and then the positions are used as the target coordinate values.

The process then sets determination points (S303). For example, positions, in design, of the three holes W111 are set as the determination points. The determination points, expressed as $^{B}p_{add}$ (i) (i=1 to 3), are stored in the HDD 604.

The process then sets the thresholds δ and Δ (S304). This work is the same as Step S104 of the first embodiment. The threshold δ is determined in consideration of a fitting tolerance between the holes W111 and the pins W103 and a dimension of C-chamfering, and may be 0.1 mm. The threshold Δ is determined in consideration of the measurement accuracy of the stereo camera 300 and the size tolerance of the reference holes W104. For example, when the position-and-size tolerance of the reference holes W104 is 0.05 mm and the measurement accuracy of the stereo camera 300 is 0.05 mm, a total value of 0.1 mm is determined as a margin, and the threshold Δ is set as a value of 0.2 mm.

Figure 16:
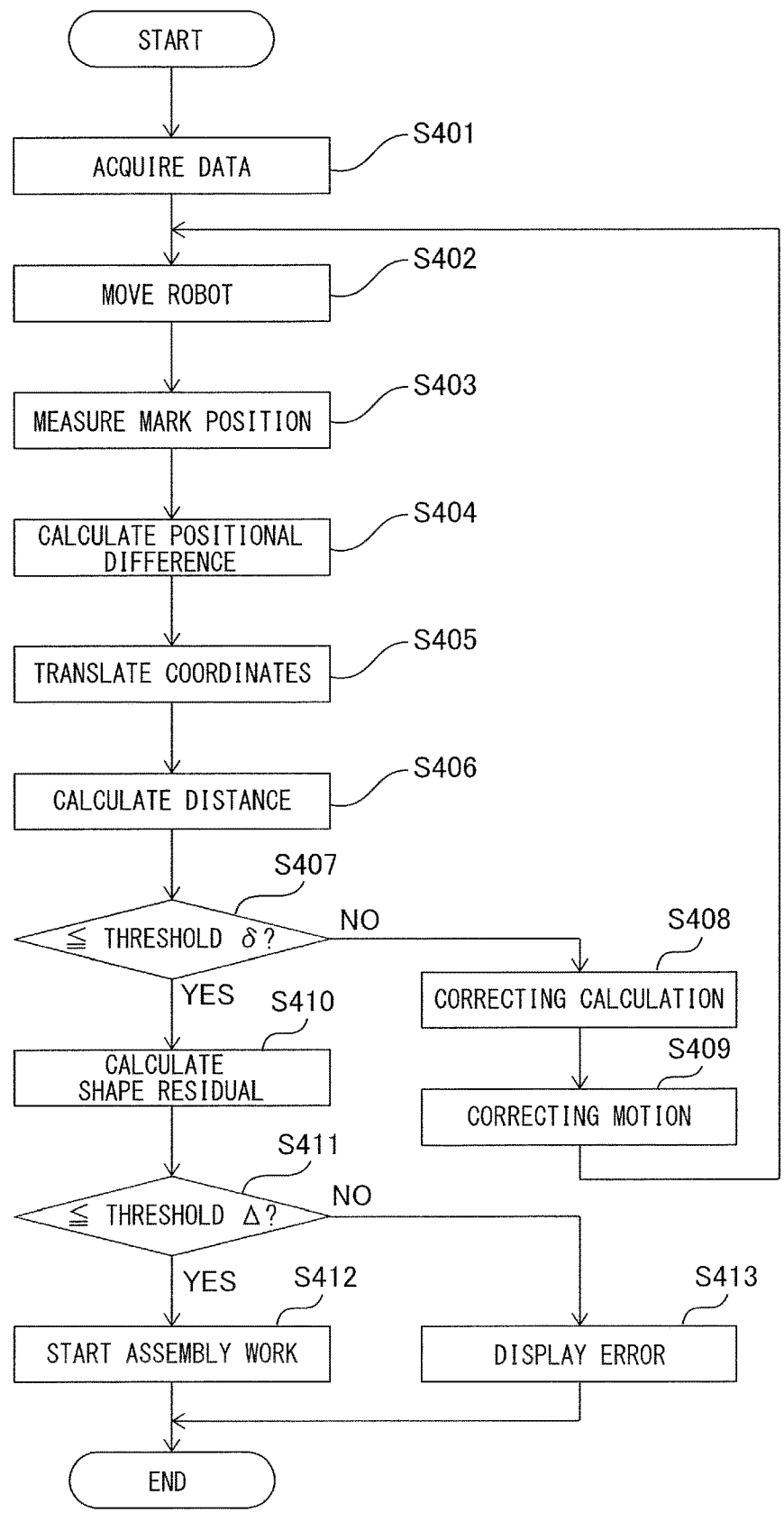
FIG. 16 is a flowchart of assembly work of the second embodiment.

FIG. 16 is a flowchart of assembly work of the second embodiment. In actual production, the assembly work is repeatedly performed on workpieces which sequentially come; but FIG. 16 illustrates one cycle of the assembly work.

As is in the first embodiment, the CPU 601 first obtains various parameters including the target coordinate values $^{B}p(i)$ (i=1 to 3) of the feature points and the coordinate values $^{B}p_{add}(i)$ (i=1 to 3) of the determination points, by reading those parameters from the HDD 604 (S401: obtaining step, obtaining process).

The CPU 601 then sends a command to the CPU 501, then causes the robot arm 201 to move to a feed unit (not illustrated), and then causes the robot hand 202 to hold the workpiece W12. The workpiece W12 is positioned by the fingers 211 and 212 of the robot hand 202, and held by the same within a predetermined precision range.

The CPU 601 then moves the robot 200, that is, the robot arm 201 to a teach point which is taught in advance, and which indicates an assembly start position (S402: motion step, motion process). The teach point, which indicate the assembly start position, is a posture of the robot 200 which starts the repetitive control with the aid of the stereo camera 300. Also, at the teach point, the reference holes W104 are contained in the field of view of the stereo camera 300.

The CPU 601 then causes the stereo camera 300 to measure the positions of the reference holes W104 (S403: measurement step, measurement process). That is, as is in Step S202, the CPU 601 determines the measured coordinate values $^{B}q(i)$ of the reference holes W104 with respect to the base coordinate system B, through the measurement by the stereo camera 300.

The CPU 601 then calculates the amount of positional difference between the target values and the measurement values, as is in Step S203 (S404). That is, the CPU 601 determines, in Step S404, the rotation matrix R, which is a coordinate transformation matrix, and the translation vector t. The rotation matrix R and the translation vector t indicate the amount of positional difference between the target coordinate values $^B p(i)$ (i=1 to 3) and the measured coordinate values $^B q(i)$ (i=1 to 3) (first computing step, first computing process).

The CPU 601 then uses the rotation matrix R and the translation vector t, and coordinate-transforms the target coordinate values $^B p(i)$ (i=1 to 3) of the feature points to determine the target coordinate values $^B p'(i)$ (i=1 to 3), as is in Step S204 (S405). In Step S405, the CPU 601 also uses the rotation matrix R and the translation vector t, and coordinate-transforms the coordinate values $^B p_{add}(i)$ (i=1 to 3) of the determination points to determine the coordinate values $^B p'_{add}(i)$ (i=1 to 3), as is in Step S204.

Since the second embodiment uses the plurality of determination points, the CPU 601 performs the coordinate transformation by using the following expression (16).

$$^B p'_{add}[i] = R \cdot {}^B p_{add}[i] + t \, (i=1,2,3) \quad (16)$$

The CPU 601 then determines distances between the points obtained before and after the coordinate transformation, as is in Step S205 of the first embodiment (S406: second computing step, second computing process). Specifically, the CPU 601 performs the computation similar to that of the first embodiment, and determines the distances d(i) (i=1 to 3) between the target coordinate values $^B p(i)$ (i=1 to 3) obtained before the coordinate transformation and the target coordinate values $^B p'(i)$ (i=1 to 3) obtained after the coordinate transformation. In addition, the CPU 601 determines distances $d_{add}(i)$ (i=1 to 3) between the coordinate values $^B p_{add}(i)$ (i=1 to 3) obtained before the coordinate transformation and the coordinate values $^B p'_{add}(i)$ (i=1 to 3) obtained after the coordinate transformation, by using the following expression (17).

$$d_{add}[i] = |{}^B p'_{add}[i] - {}^B p_{add}[i]| \, (i=1,2,3) \quad (17)$$

The CPU 601 then compares the distances, d(i) (i=1 to 3) and $d_{add}(i)$ (i=1 to 3) between the points, with the threshold δ; and thereby determines whether the distances converge, as is in Step S206 of the first embodiment (S407). That is, the CPU 601 determines whether the following expression (18) holds.

$$\max\left[\left(\max_{i=1,2,3} d[i]\right), \left(\max_{i=1,2,3} d_{add}[i]\right)\right] \leq \delta \quad (18)$$

If all the distances, d(i) and $d_{add}(i)$, between the points are equal to or smaller than the threshold δ, the distances converge. If at least one of the distances, d(i) and $d_{add}(i)$, between the points exceeds the threshold δ, the distances do not converge.

If at least one of the distances, d(i) and $d_{add}(i)$, between the points exceeds the threshold δ in Step S407 (S407: No), the CPU 601 outputs the determination result, the rotation matrix R, and the translation vector t to the CPU 501 of the robot control device 500. As is in Step S207 of the first embodiment, the CPU 501 determines a posture command, which causes the robot 200, that is, the robot arm 201 to take a corresponding posture, depending on the rotation matrix R and the translation vector t (S408). The CPU 501 then corrects the posture of the robot 200, that is, the robot arm 201, in accordance with the posture command, as is in Step S208 of the first embodiment (S409: posture correction step, posture correction process). The CPU 601 then returns to Step S402, and repeats the correcting motion of the robot 200 until Step S407 determines that the distances converge. If the CPU 601 determines that the distances converge, that is, determines that the distances are equal to or smaller than the threshold δ (S407: Yes), then the CPU 601 calculates a shape residual as is in Step S210 of the first embodiment (S410), and compares the shape residual with the threshold Δ, as is in Step S210 of the first embodiment (S411).

If the CPU 601 determines, in Step S411, that the distance $e_{max}$ is equal to or smaller than the threshold Δ, the CPU 601 causes the robot 200 to perform predetermine work, that is, assembly work (S412: work step, work process). Specifically, the CPU 601 causes the robot hand 202 to move downward and assemble the workpiece W12 to the workpiece W11. This allows the assembly to be performed in a state where the positions of all the holes W111 sufficiently coincide with the positions of all the pins W103, thus shortening the assembly time and increasing productivity.

If the CPU 601 determines, in Step S411, that the distance $e_{max}$ exceeds the threshold Δ, the CPU 601 indicates the contents of the error to a user, that is, causes the display 700 to display the contents of the error, and temporarily stops the robot 200 (S413). This increases the reliability of assembly work performed by the robot 200.

Here, if a user knows, for example, that the variation of the workpiece W11 caused by machining is large, the workpiece W11 may be replaced by another workpiece without performing the error stop, and then Step S402 may be performed again on the new workpiece W11.

As described above, the second embodiment sets a condition for performing the convergence determination on the simultaneous fitting of multiple points, by using the threshold δ for the distances of the determination points. In addition, the determination points may be set outside the field of view of the stereo camera 300. Particularly in the case where such fitting of multiple points is performed, the conventional convergence determination using a position and an angle tends to complicate the calculation of the determination condition. The second embodiment, however, can easily set the threshold δ. Furthermore, since all the points are positioned within a desired precision range before the assembly work is performed by the robot 200, the robot 200 can perform the assembly work with high accuracy and high reliability. In addition, since the calibration of the stereo camera 300 is performed with respect to the mechanical references as is in the first embodiment, the positioning state of the robot hand 202 can be determined regardless of accuracy in motion of the robot arm 201. In addition, the repetitive convergence motion is performed depending on results of the measurement of the positional difference, performed by the stereo camera 300; and the assembly work is performed after the results of the measurement converge into a predetermined range. Thus, even when the motion of the robot arm 201 has an error, the influence by the error is reduced, and the assembly work can be performed by the robot 200 in a state where a predetermined positioning accuracy is satisfied. As to the feature points, there is used the determination method which uses the distances between the feature points obtained before and after the coordinate transformation, that is, the distances between the point groups which are congruent to each other, as is in the first embodiment. Thus, this method is not easily affected by disturbance factors, such as measurement error, and can set an appropriate threshold δ. In addition, as is in the first embodiment, the process of Step S411 can perform reliable assembly work.

In the second embodiment, the description has been made for the case where the convergence determination of Step S407 is performed by comparing all the distances, d(i) and $d_{add}(i)$ between the points, with the threshold δ. In the case of the fitting of workpieces, however, the positions of the three holes W111 are particularly important. Thus, the determination may be performed by comparing only distances $d_{add}(i)$ with the threshold δ. Here, the distances $d_{add}$(i) are distances between the determination points corresponding to the positions of the holes W111 and obtained before the coordinate transformation and the determination points corresponding to the positions of the holes W111 and obtained after the coordinate transformation. When both the position and the posture are determined by using only the determination points, three or more determination points are preferably used, as is in the present embodiment.

Third Embodiment

Figure 17:
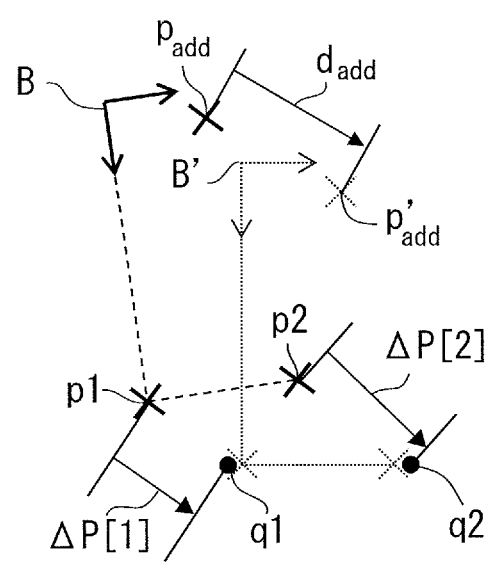
FIG. 17 is a schematic diagram for illustrating a computing process of a third embodiment.

Next, a robot system of a third embodiment of the present invention will be described. FIG. 17 is a schematic diagram for illustrating a computing process of the third embodiment. A configuration of the robot system of the third embodiment is the same as that of the first embodiment, and the description thereof will be omitted.

In the third embodiment, calculation of the distances is different from the calculation of the distances performed in Step S205 described in the first embodiment. Specifically, the difference is described as follows. In the first embodiment, the CPU 601 uses the expression (9), and determines the distances d(i) (i=1 to 3) between the points having the target coordinate values $^B p(i)$ (i=1 to 3) obtained before the coordinate transformation and the points having the target coordinate values $^B p'(i)$ (i=1 to 3) obtained after the coordinate transformation. In the third embodiment, the CPU 601 determines, in Step S205, not the distances d(i) but distances ΔP(i) (i=1 to 3) between the target coordinate values $^B p(i)$ (i=1 to 3) of the feature points and the measured coordinate values $^B q(i)$ (i=1 to 3) of the feature points, by using the following expression (19).

$$\Delta P[i]=|{}^B q[i]-{}^B p[i]| (i=1,2,3) \quad (19)$$

That is, as illustrated in FIG. 17, the CPU 601 determines a distance ΔP(1) between a target coordinate value p1 and a measured coordinate value q1, and a distance ΔP(2) between a target coordinate value p2 and a measured coordinate value q2.

The CPU 601 then determines, in Step S206, whether not the above-described expression (11) but the following inequality (20) holds.

$$\max\left[\left(\max_{i=1,2,3} \Delta P[i]\right), d_{add}\right] \le \delta \quad (20)$$

In the above manner, in a case where variation in errors of the measurement by the stereo camera 300 is small, the same effect as that of the first embodiment is produced, even when the distances between the target coordinate values of the feature points and the measured coordinate values of the feature points is used for the convergence determination using the threshold δ. The calculation of the distances performed in the third embodiment may be used for the calculation of the distances performed in Step S406, described in the second embodiment.

The present invention is not limited to the above-described embodiments, and may be variously modified within the technical concept of the present invention. In addition, the effects described in the embodiments are merely the most suitable effects produced by the present invention. Thus, the effects by the present invention are not limited to those described in the embodiments.

In the first to the third embodiments, the description has been made for the case where the stereo camera 300 is used as a vision sensor. But the vision sensor is not limited to the stereo camera 300. For example, a vision sensor using a method, such as a pattern projection method using a projector, a laser light section method, or a Time-of-Flight method, may be used. In this case, the vision sensor is preferably a three-dimensional vision sensor which can measure a three-dimensional position and orientation.

In addition, the number of the determination points is one in the first embodiment, and three in the second embodiment. However, the number is not limited to those numbers, and may be two, or four or more. In addition, the feature points are described as the marks in the first embodiment, and as reference holes in the second embodiment. However, the feature points are not limited to those, and may be any points as long as the points can be recognized as the feature points. In addition, the description has been made for the case where the number of the feature points is three, but the number is not limited to three. However, the number of the feature points is preferably three or more.

In the second embodiment, the description has been made for the case where the stereo camera 300 is installed on the robot hand 202, but the installation position is not limited to this. For example, the stereo camera 300 may be installed on the leading end of the robot arm 201, or in the robot hand 202.

Also in the second embodiment, the description has been made, as an example, for the case where the workpiece W12 can be held by the robot hand 202 at a predetermined position with high reproducibility. However, the holding position may vary greatly. In this case, the variation in the holding positions may also be measured, and the target positions used for the repetitive control and the positions of the determination points may be corrected. As a modification of the second embodiment, another vision sensor may be disposed at a position which does not move with the robot 200, and may measure the holes W111 to measure a positional difference of the holding position. In this case, even when the holding position is displaced, the same convergence determination can be performed by coordinate-transforming and correcting the target positions and the positions of the determination points with respect to the tool coordinate system T, depending on a measurement value by the other vision sensor.

In the first to the third embodiments, real-time property of the processes is not limited. However, these embodiments may be applied to low-speed repetitive control performed by the robot control device, or may be applied to high-speed and real-time visual feedback control, called visual servo.

The present invention can also be achieved by providing a program, which performs one or more functions of the above-described embodiments, to a system or a device via a network or a storage medium, and by causing one or more processors, which are included in the system or the device, to read and execute the program. In addition, the present invention can also be achieved by using a circuit, such as an ASIC, which performs one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-022566, filed Feb. 9, 2017, which is hereby incorporated by reference wherein in its entirety.

What is claimed is:

1. A method of controlling a robot apparatus comprising:
obtaining a target coordinate value related to a positional relationship of a feature point;
obtaining a determination point, which is different from the feature point and moves following a motion of the robot apparatus;
obtaining a measured coordinate value of the feature point by using a vision sensor supported by the robot apparatus;
transforming the target coordinate value and the determination point into a transformed target coordinate value and a transformed determination point respectively, so that the transformed target coordinate value is closer to the measured coordinate value of the feature point;
obtaining a first difference between the determination point and the transformed determination point; and
determining whether the first difference is equal to or smaller than a first predetermined threshold value.

2. The method according to claim 1, wherein the robot apparatus comprises a robot hand,
wherein the determination point is a freely-selected point within a region, and
wherein the region is obtained by adding a holding region in which the robot hand is able to hold a workpiece, to an outer shape of the workpiece held by the robot hand.

3. The method according to claim 1, wherein the determination point is an origin of a coordinate system of the vision sensor.

4. The method according to claim 1, further comprising:
obtaining a second difference between the target coordinate value and the transformed target coordinate value; and
determining whether the second difference is equal to or smaller than the first predetermined threshold value.

5. The method according to claim 1, further comprising obtaining a transformation parameter which transforms the target coordinate value into the transformed target coordinate value, so that the transformed target coordinate value is closer to the measured coordinate value of the feature point,
wherein in the transforming, the target coordinate value and the determination point are transformed into a transformed target coordinate value and a transformed determination point respectively, by using the transformation parameter.

6. The method according to claim 5, wherein the transformation parameter comprises a coordinate transformation matrix, comprising a translation vector and a rotation matrix.

7. The method according to claim 1, wherein the vision sensor is a stereo camera having a first camera and a second camera.

8. The method according to claim 1, wherein the robot apparatus comprises a robot hand, and
wherein the vision sensor is fixed to the robot hand.

9. The method according to claim 1, wherein the robot apparatus comprises a robot hand, and
wherein the vision sensor is held by the robot hand in a state where the vision sensor is positioned by a positioning mechanism.

10. The method according to claim 5, further comprising:
determining whether the second difference is equal to or small than a second predetermined threshold value, which is different from the first predetermined threshold value, in the case where both the first difference and the second difference are equal to or smaller than the first predetermined threshold value; and
indicating a content of an error, in the case where the second difference is greater than the second predetermined threshold value.

11. A non-transitory computer-readable recording medium storing a program for causing a computer to execute the method of controlling a robot apparatus according to claim 1.

12. The method according to claim 5, further comprising:
obtaining a second difference between the determination point and the transformed determination point;
operating the robot apparatus based on the transformation parameter, in the case where one of the first difference and the second difference is greater than the first predetermined threshold value;
obtaining a measured coordinate value of the feature point, by using a vision sensor, until both the first difference and the second difference are equal to or smaller than the first predetermined threshold value;
obtaining a second transformation parameter which transforms the target coordinate value into the transformed target coordinate value, so that the transformed target coordinate value coincides with the measured coordinate value of the feature point;
obtaining a first difference between the determination point and the transformed determination point;

obtaining a second difference between the determination point and the transformed determination point;

determining whether the both the first difference and the second difference are equal to or smaller than the first predetermined threshold value; and operating the robot apparatus based on the second transformation parameter, in the case where one of the first difference and the second difference is greater than the first predetermined threshold value.

13. The method according to claim 5, further comprising:

determining whether the second difference is equal to or smaller than a second predetermined threshold value, which is different from the first predetermined threshold value, in the case where both the first difference and the second difference are equal to or smaller than the first predetermined threshold value; and operating the robot apparatus a predetermined operation, in the case where the second difference is equal to or smaller than the second predetermined threshold value.

14. A robot system comprising:

a robot apparatus;

a vision sensor supported by the robot apparatus; and a controller configured to control the robot apparatus and the vision sensor, wherein the controller is configured to:

obtain a target coordinate value related to a positional relationship of a feature point;

obtain a determination point, which is different from the feature point and moves following a motion of the robot apparatus;

obtain a measured coordinate value of the feature point by using a vision sensor supported by the robot apparatus;

transform the target coordinate value and the determination point into a transformed target coordinate value and a transformed determination point respectively, so that the transformed target coordinate value is closer to the measured coordinate value of the feature point;

obtain a first difference between the determination point and the transformed determination point; and determine whether the first difference is equal or smaller than a first predetermined threshold value.

15. A manufacturing method for a product, comprising:

providing the robot system according to claim 14; and manufacturing the product by using the robot system.

16. The robot system according to claim 14, further comprising:

an input unit configured to receive an input from a user toward the controller, wherein the controller obtains, via the input unit, setting information data on a determination point, and wherein the controller controls the robot apparatus, by using the setting information data on the determination point and the feature point.

17. The robot system according to claim 14, further comprising a display configured to display a setting window used to set a coordinate value of the determination point, wherein the display displays a plurality of alternatives of the determination point on the setting window, and allows a user to select one of the plurality of alternatives of the determination point.

18. The robot system according to claim 17, wherein the display includes a display area used to display a three-dimensional image, and wherein the display displays a relative relationship between the feature point and the determination point in the display area.

19. The robot system according to claim 18, wherein the display area superimposes the feature point and the determination point on at least one of the robot and the vision sensor.

20. The robot system according to claim 14, wherein the vision sensor is a stereo camera having a first camera and a second camera.

21. The method according to claim 5, further comprising:

determining whether the second difference is equal to or smaller than a second predetermined threshold value, which is different from the first predetermined threshold value, in the case where both the first difference and the second difference are equal to or smaller than the first predetermined threshold value; and setting the posture of the robot apparatus, taken at the time, as the teaching point, in the case where the second difference is equal to or smaller than the second predetermined threshold value.

* * * * *